United States Patent
Surasinghe

(10) Patent No.: US 7,124,145 B2
(45) Date of Patent: Oct. 17, 2006

(54) SYSTEM AND METHOD FOR DYNAMIC BUSINESS LOGIC RULE INTEGRATION

(75) Inventor: Lakshitha C. Surasinghe, Dehiwela (LK)

(73) Assignee: Millennium IT (USA) Inc., Cambridge, MA (US)

( * ) Notice: Subject to any disclaimer, the term of this patent is extended or adjusted under 35 U.S.C. 154(b) by 455 days.

(21) Appl. No.: 10/400,243

(22) Filed: Mar. 27, 2003

(65) Prior Publication Data

US 2004/0194069 A1    Sep. 30, 2004

(51) Int. Cl.
G06F 17/00 (2006.01)
G06F 9/44 (2006.01)
G06F 9/45 (2006.01)
G06Q 99/00 (2006.01)

(52) U.S. Cl. .............. 707/102; 717/100; 717/140; 705/1; 705/500

(58) Field of Classification Search ............ 717/100, 717/117, 139–143, 146; 715/765; 706/3, 706/11, 45; 707/2

See application file for complete search history.

(56) References Cited

U.S. PATENT DOCUMENTS

| | | | | |
|---|---|---|---|---|
| 5,212,791 A | * | 5/1993 | Damian et al. | 705/29 |
| 5,481,647 A | * | 1/1996 | Brody et al. | 706/11 |
| 5,530,863 A | * | 6/1996 | Hino | 717/146 |
| 5,570,456 A | * | 10/1996 | Landolt | 706/3 |
| 5,701,400 A | * | 12/1997 | Amado | 706/45 |
| 5,712,958 A | * | 1/1998 | Landolt | 706/3 |
| 5,778,356 A | * | 7/1998 | Heiny | 707/2 |
| 6,374,224 B1 | * | 4/2002 | Horiguchi et al. | 704/266 |
| 6,883,144 B1 | * | 4/2005 | Zielinski et al. | 715/765 |
| 2003/0084428 A1 | | 5/2003 | Agostini et al. | |

OTHER PUBLICATIONS

Alfred V. Aho, Ravi Sethi, Jeffrey D. Ullman: "Compilers, principles, techniques, and tools", 1986, Addison-Wesley, XP002302329, p. 12, p. 15, p. 13, pp. 389-390.

* cited by examiner

*Primary Examiner*—Antony Nguyen-Ba
(74) *Attorney, Agent, or Firm*—Cesari and McKenna, LLP

(57) ABSTRACT

A system for dynamically integrating changes in rules governing business operations into a rule-implementing application program includes a dynamic business logic rule integrator ("DBLRI") that provides rules to the application software as executable routines. The DBLRI presents to a user one or more GUIs through which the user writes functional-language expressions for the rules. The GUIs provide menus of associated functions, operators and parameters that are available for use. The set of parameters associated with a given GUI is dynamically updated, to correspond to changes in the underlying business logic rules. The user writes and/or edits the expressions by selectively combining the available functions, operators and parameters. The DBLRI evaluates the functional expressions and produces associated executable parse trees or DLLs, which the application software then calls at appropriate times. The DBLRI operates also with a dynamically configurable database that provides parameters required for the rules as the rules are updated, added and/or revised.

28 Claims, 26 Drawing Sheets

SYSTEM AND METHOD FOR DYNAMIC BUSINESS LOGIC RULE INTEGRATION

BACKGROUND OF THE INVENTION

1. Field of the Invention

The invention relates generally to data processing systems and, in particular, to systems that implement business plans as a collection of business logic rules.

2. Background Information

Many businesses use customized application software to control customer transactions, billing, and so forth. The software is designed to implement the particular business plans or rules of the user companies. For a company that provides a monthly service, such as, for example, telecommunications services, customized billing software controls customer billing operations using predetermined parameters that define customer rate plans. The parameters may be, for example, the number of minutes used per month, home calling areas, roaming rates, and so forth.

A financial services company may utilize customized application software to control trading. The application software uses predetermined parameters to determine when and if a particular type of trade is to be made, what market data is generated for customers and/or brokers, and so forth. Companies providing products may also use customized application software to control business operations relating to, for example, the warehousing of raw materials, when, if, and under what terms to sell to various customers, and so forth.

The customized application software operates in accordance with the business plans, or business logic rules, set by the user company. The application relies on a defined set of parameters that the application manipulates in accordance with the business logic rules. In the example of the telecommunications company, the application software controls the rates at which telecommunications customers are billed for particular telecommunication services based on the total number of minutes used per month, the home areas of the respective customers, associated roaming rates, and so forth. The set of parameters that define the billing plans are hard-coded into the application program, and the company can then selectively set associated values for the various parameters to distinguish, for example, between the various billing rate plans offered by the company. The application program thus allows the user company to selectively set the values for the minimum number of minutes that are associated with the various discount rates, and so forth, without requiring the application program to be re-written and re-compiled.

The application software can not, however, accommodate new business plans that either re-define the existing hard-coded parameters or include new parameters. For example, the application software must be re-written if the telecommunications company discussed above changes its billing plans to charge different rates for minutes used during particular hours. Similarly, the billing application software must be re-written if the company decides to offer new types of services, such as data transmission services, internet services, and so forth. The application software is thus re-written to include the various parameters associated with the new data transmission services and internet services, and/or the parameters associated with the time of day/week billing rates, and so forth.

For a financial services company, the application software is customized to handle the various validation, matching, execution and post-execution activities that the company uses to control the trading of particular types of securities. The application software must be re-written if the company thereafter changes the criteria it uses to, for example, validate a trade, or if the company decides to trade in a new type of security. The various validation, matching, execution and post-execution rules must be revised to include or accommodate the new criteria and/or the new type of security, as well as the revised criteria for the gathering of associated market data.

The updating of complex, customized application software is both time consuming and costly. Further, due to the complexity of the undertaking, the re-writing of the program is prone to errors. The updating must typically be performed by the company that provided the software, which is not only costly but can be delayed since the user must rely on the availability of outside personnel to do the work. In addition, re-writing and re-compiling the code may adversely affect the performance of the application in ways in which are not readily apparent, and thus, the testing of the software is critical. Longer delays are incurred if, after testing, the application code must be re-written to correct errors, and again tested.

The time it takes to update and test and, as applicable, revise and re-test, the application software may cause rather significant delays in the offering of new services and/or billing plans to customers. In response, the customers may change service providers in order to take advantage of the newer plans and/or services offered by competitors. Hidden errors in the re-written application program may also adversely affect customer relations and/or the integrity of the services provided. Such an error may, for example, result in duplicate or incorrect billing for particular services, the inability to track or confirm particular financial transactions, and so forth.

What is needed is a system that allows a user to revise business logic rules, without requiring the re-writing and re-compiling of the application software.

SUMMARY OF THE INVENTION

The invention is a system for dynamically integrating changes in the rules governing business operations into an application program that implements the rules in order to control business operations. The system includes a dynamic business logic rule integrator ("DBLRI") that essentially provides business logic rules to the application software as executable routines. When new rules and revised rules are written, the DBLRI provides new routines and the application software readily incorporates the new and/or revised rules by calling the routines at the appropriate times. As discussed in more detail below, the DBLRI provides to a user one or more interfaces through which the user writes expressions for business logic rules in a functional language that, as discussed in more detail below, allows the user to specify the rules essentially as executable routines. The DBLRI then translates the functional language expressions into executable parse trees or DLLs, which are then available to the application program.

The DBLRI operates with a database in which certain or all of the database fields and sub-fields correspond to parameters that are available to the user for inclusion in the business logic rules. The database is dynamically configurable, such that new fields and sub-fields of interest can be added as required by changes to the underlying business and/or the business logic rules. The DBLRI thus allows the user to incorporate newly added and/or redefined parameters into the existing application software, without requiring the re-writing and re-compiling of the application software.

More specifically, the DBLRI presents to a user one or more graphical user interfaces ("GUIs") through which the user writes functional-language expressions for the business logic rules. The respective GUIs correspond to various types of business logic rules, and provide to the user menus of associated functions, operators and parameters that are available for use. The set of parameters associated with a given GUI is dynamically updated, to correspond to changes in the underlying business logic rules. The user writes and/or edits the expressions for the respective business logic rules by selectively combining the available functions, operators and parameters.

The DBLRI translates the functional expressions into executable routines by evaluating the corresponding expressions and producing associated executable parse trees or DLLs. The application software then calls the executable routines at appropriate times.

In the example of the telecommunications company discussed above, the DBLRI initially provides to the user, through various GUIs, functions, operators and parameters associated with customer billing plans that set rates based on the total number of minutes used per month. The user selectively combines the functions, operators and parameters into expressions of the associated business logic rules, and the DBLRI translates the expressions into executable routines.

When the company changes its billing rate plans to include rates that are based also on the particular times of day/week during which the minutes are used, the database is dynamically expanded to include associated "time" fields and sub-fields. The DBRLI includes the new time parameters in the appropriate GUIs, and the user selects the time parameters for inclusion in the expressions for the new business logic rules. The DBLRI translates the new expressions into corresponding executable routines that are then available to the application software. Thereafter, the application software calls the appropriate routines and calculates the customer bills in accordance with the new rules. The new rules are thus integrated into the application software, without requiring the re-writing or re-compiling of the application software.

The DBLRI also readily accommodates new business practices by incorporating re-defined parameters. If, for example, the financial service company discussed above expands its services to include a new type of security, the DBLRI essentially expands the definitions of the associated parameters in rules that control trade validation, matching and so forth. The DBLRI thus revises the tables that associate fields and sub-fields of the database with the respective parameters that are included in the various trade rules, by adding to the tables the fields and sub-fields associated with the newly traded security.

The existing rules then accommodate the new type of security. This is in contrast to known prior systems, which require the re-writing and re-compiling of the application software to re-define old parameters in and/or add new parameters to the set of hard-coded parameters contained in the application.

The current system, which uses parse trees and DLLs to processes the business logic rules, may process the respective rules less efficiently than the known prior systems that incorporate the business logic rules directly into the application program. However, the current system provides the user with a flexibility to change the business rules that is not present in the prior systems. The current system thus trades some speed for the flexibililty to add, remove and change business logic rules without altering the application software.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
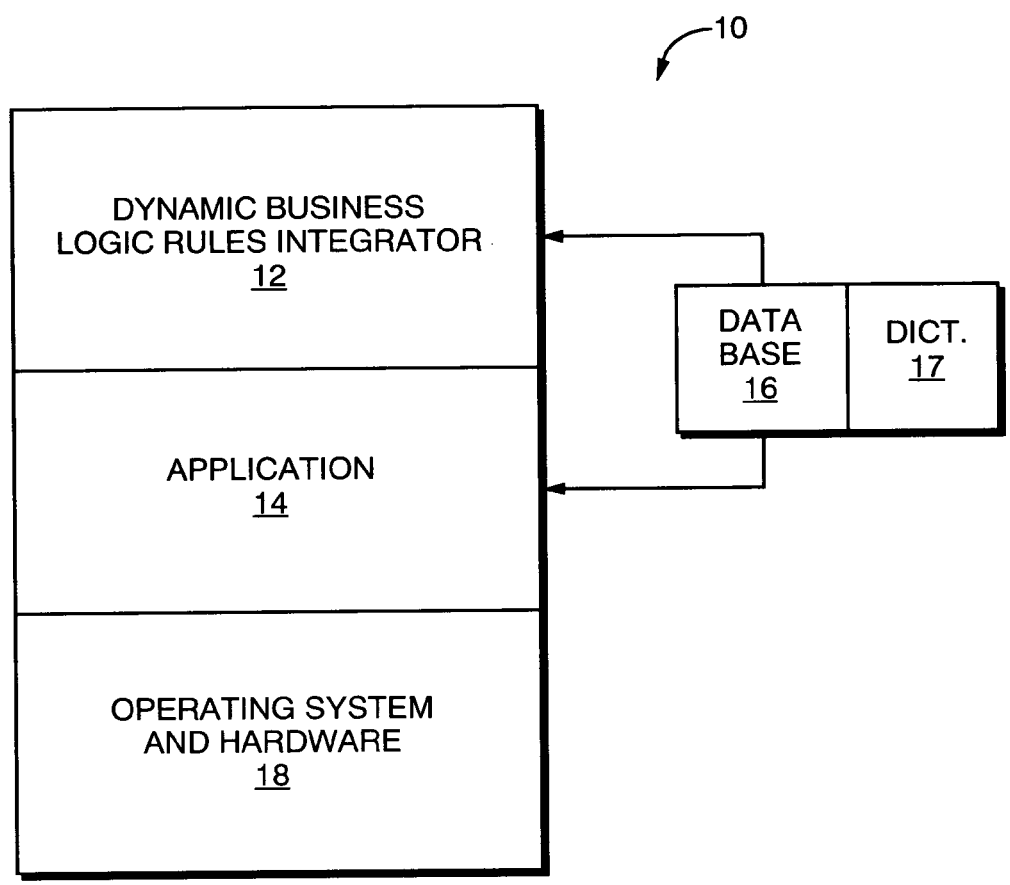
FIG. 1 is a functional block diagram of a system constructed in accordance with the current invention.

Referring now to FIG. 1, a system 10 that incorporates the invention includes a dynamic business logic rule integrator ("DBLRI") 12, which provides to application software 14 various business logic rules in the form of executable routines. The DBLRI and the application software each communicate with a relational database 16, which contains data that are used by the application program. The database is organized into fields and sub-fields (not shown) that correspond to parameters that are included in the business logic rules. The application software 14 communicates in a conventional manner with the database 16, and also with system hardware and software, which are denoted collectively in the drawing by the numeral 18. The system hardware and software 18 provide connections via messaging middleware and/or other communications services to subscriber services that supply data to the database. Further, the system hardware and software operate with the application software to evaluate and/or manipulate the data in accordance with the business logic rules.

As discussed in more detail below with reference to FIGS. 3–15, the DBLRI 12 utilizes a functional language that allows a user to state a business logic rule, or functional program, as a single expression. The DBLRI 12 then translates the expression into a routine that the application software 14 calls and executes at appropriate times. When the underlying business plans change such that certain or all of the business logic rules must be revised or new rules added, the user creates new expressions and/or re-writes affected expressions and the DBLRI 12 produces corresponding executable routines for use by the application software 14. The system 10 can thus dynamically incorporate new or revised business logic rules into the business operations controlled by the application software, without requiring the re-writing and re-compiling of the application software.

The database 16 is dynamically configurable. New fields and sub-fields are added to the database using dynamic schema that link the fields and sub-fields to the various types or categories of rules, as discussed in more detail below.

The operations of the system 10 and, in particular, the DBLRI 12 are explained below in terms of one or more examples. The system and the DBLRI are not, however, limited to the types of businesses and/or types of transactions that are discussed in the examples.

Figure 2A:
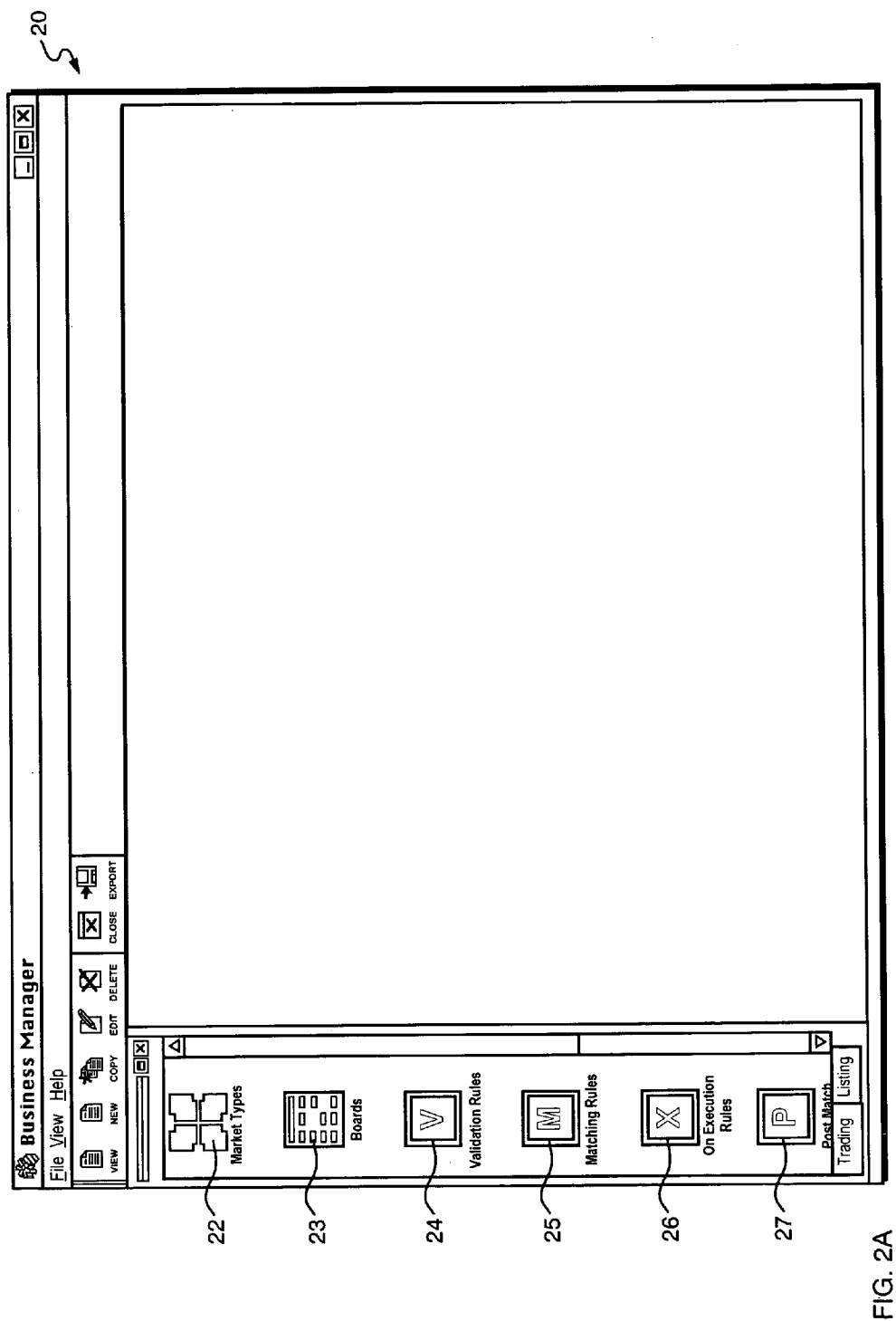
FIGS. 2A–4B are screens that illustrate various operations of the system of FIG. 1 associated with creating and editing business logic rule expressions.
Figure 2B:
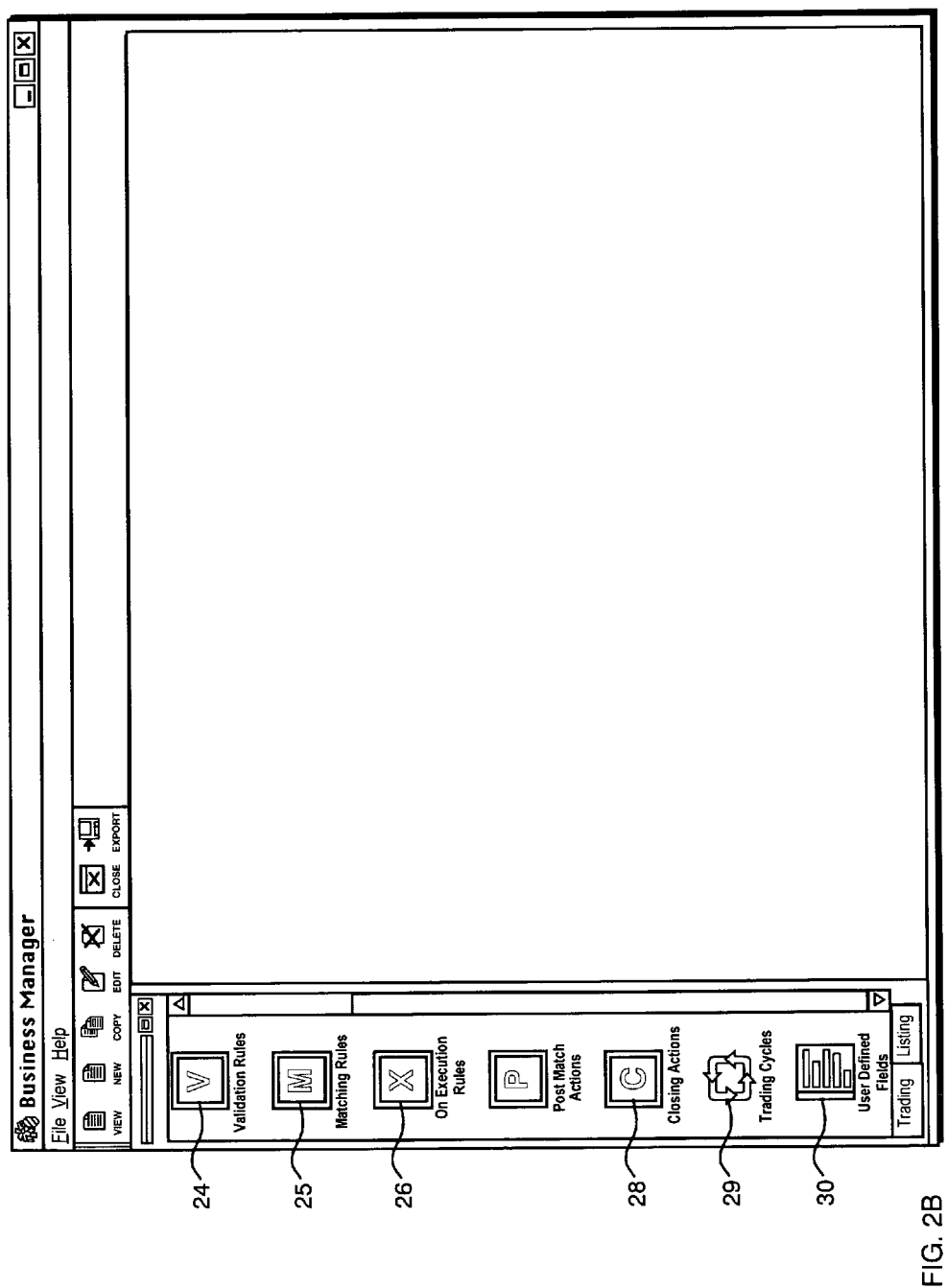

Referring now also to FIGS. 2A and B, the DBLRI 12 provides to a user one or more graphical user interfaces ("GUIs") 20 that allow a user to view, create, and/or edit business logic rules that are utilized to control business operations of interest. In the example of a financial services company, the DBLRI 12 provides a user with GUIs that correspond to respective types of trading rules, for example, validation rules, matching rules, on-execution rules, post-match rules, closing action rules, and so forth. Further, as discussed in more detail below, the user may also view, create and edit user defined parameters or data objects that establish various trading instruments, various market types that define in which market a user may operate, and so forth.

Figure 3:
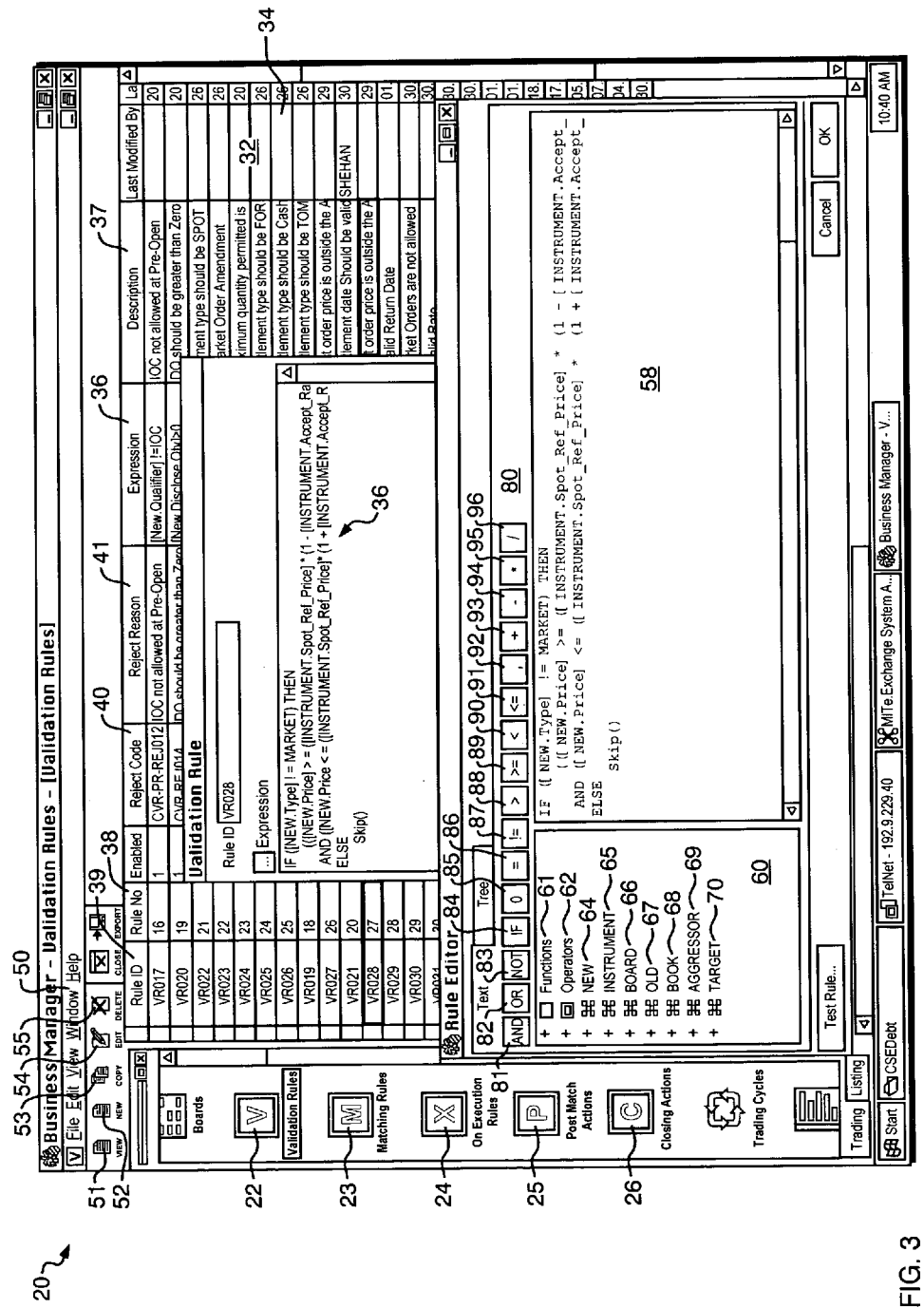

The user selects a rule category of interest by "clicking on" one of the appropriate buttons 22–30. In the example, the user selects validation rules by clicking on button 24. As shown in FIG. 3, the validation rule GUI presents the user with a table 32 of the current validation rules. The user may then click on the table entry 34 for a rule of interest to examine the rule. As shown in the table, the rule includes a functional-language expression 36 of the underlying business logic rule and a brief description 37 of the rule. The rule also includes a unique rule identifier 39, and a rule number 38 that indicates the position of the rule in the table. In addition, the rule may also include a rejection reason 41 that lists what is presented to the user when the rule is invoked, and a rejection code 40 that is used internally by the system to test or track the operations that invoke the rule. The rejection code points to a code verification rule that collects associated data, such as the number of times the rule is invoked, and so forth. The creating of the respective rules will be discussed in more detail below.

In the example, the user elects to edit validation rule VR028 by selecting the rule and clicking on the edit function button 52 in the header 50. The DBLRI rule editor presents to the user, in a sub-window 58, the functional-language expression of rule VR028. Further, the DBLRI rule editor provides a menu 60 with selections for functions 61, operators 62, and associated parameter types 63, i.e., new 64, instrument 65 . . . aggressor 69, target 70, and so forth, that relate to trade validation operations, as defined by industry standards and/or the underlying business operations of the user. The operators, functions and data types are pre-defined during system set up. However, the user may add new parameters, and write new rules or edit existing rules by selectively incorporating various parameters, operators and functions.

The validation rule VR028 includes a defined term or "keyword," namely, "MARKET," as denoted by all capital letters. The keywords, are recognized, or common, terms in the applicable industry, and are either contained in a functional language dictionary 17 (FIG. 1) that is included in the database 16 or dynamically defined by the user, as discussed in more detail below.

The user incorporates the keywords in the expressions 36 for the business rules in much the same way that the terms are used in the corresponding spoken language. In the example, the keyword MARKET is used to define an order type. Thus, the functional language equivalent of stating that the new order must not be a market order is NEW.Type!=MARKET, where NEW.Type is a parameter that is selected from the NEW parameter type entry 64 in menu 60, the logical operation != is selected using button 87 in the header 80, and the term MARKET is selected from the dictionary 17. The definition of MARKET incorporates the criteria, or selected field information, associated with market orders, and thus, represents one or more conditions that a given parameter must meet to be defined as a market order. The keywords are essentially data objects that satisfy specified criteria. Similarly, the functions and operators are defined within the system, such that the system operatively performs the appropriate steps with the associated parameters, to control the business operations in accordance with the business logic rules.

To produce an expression for a new or an edited business logic rule, the user incorporates particular functions, operations, parameters, logical operators and key words that correspond to the underlying business operation. As shown in the drawing, the user writes and/or edits the expression for a business logic rule using a functional language that has a syntax that is relatively close to a spoken language. As discussed below, the functional language specifies the rule essentially as an executable routine.

When a new rule is added the user also specifies when the new rule is invoked relative to the other rules in a particular category, i.e., within the validation rule category, by assigning the rule a position in the table 32 of validation rules. The system thus allows the user to create, update, and essentially re-design rule-based operations that perform in a manner that is analogous to how the business itself operates.

When the editing of the rule is completed, the DBLRI 12 evaluates the expression and produces a corresponding executable routine that can be called by the application software. The DBLRI generally produces a parse tree when the corresponding business is logic rule controls day-to-day, or "on-line," actions. The DBLRI produces the DLL when the routine is one that is utilized "off-line," such as a rule that manipulates accumulated data. An example of a rule that is translated into a DLL is a rule that sets discounted billing rates based on minutes used during a given billing cycle. The DLLs may be written in, for example, C++, and compiled in a conventional manner.

Figure 4A:
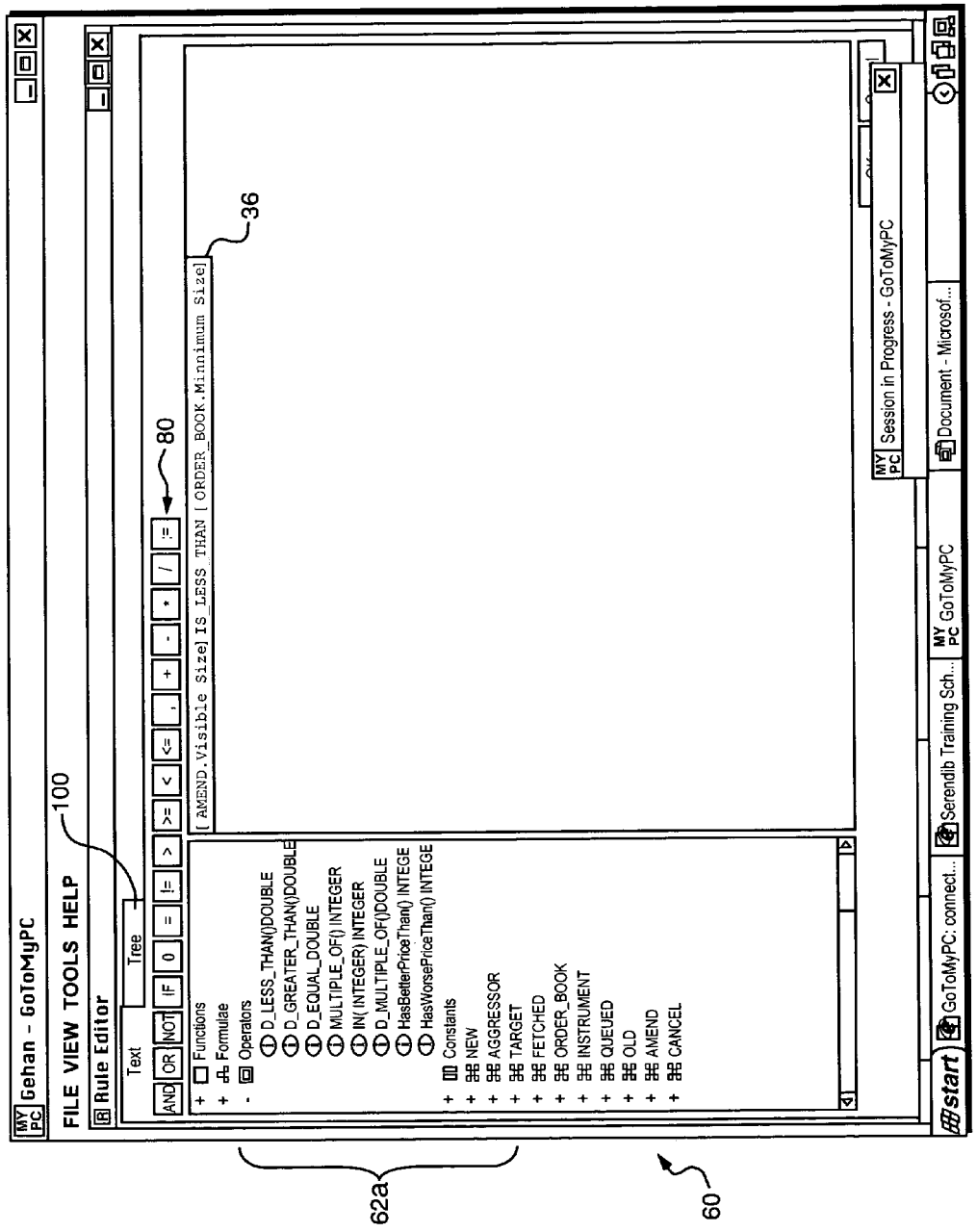
Figure 4B:
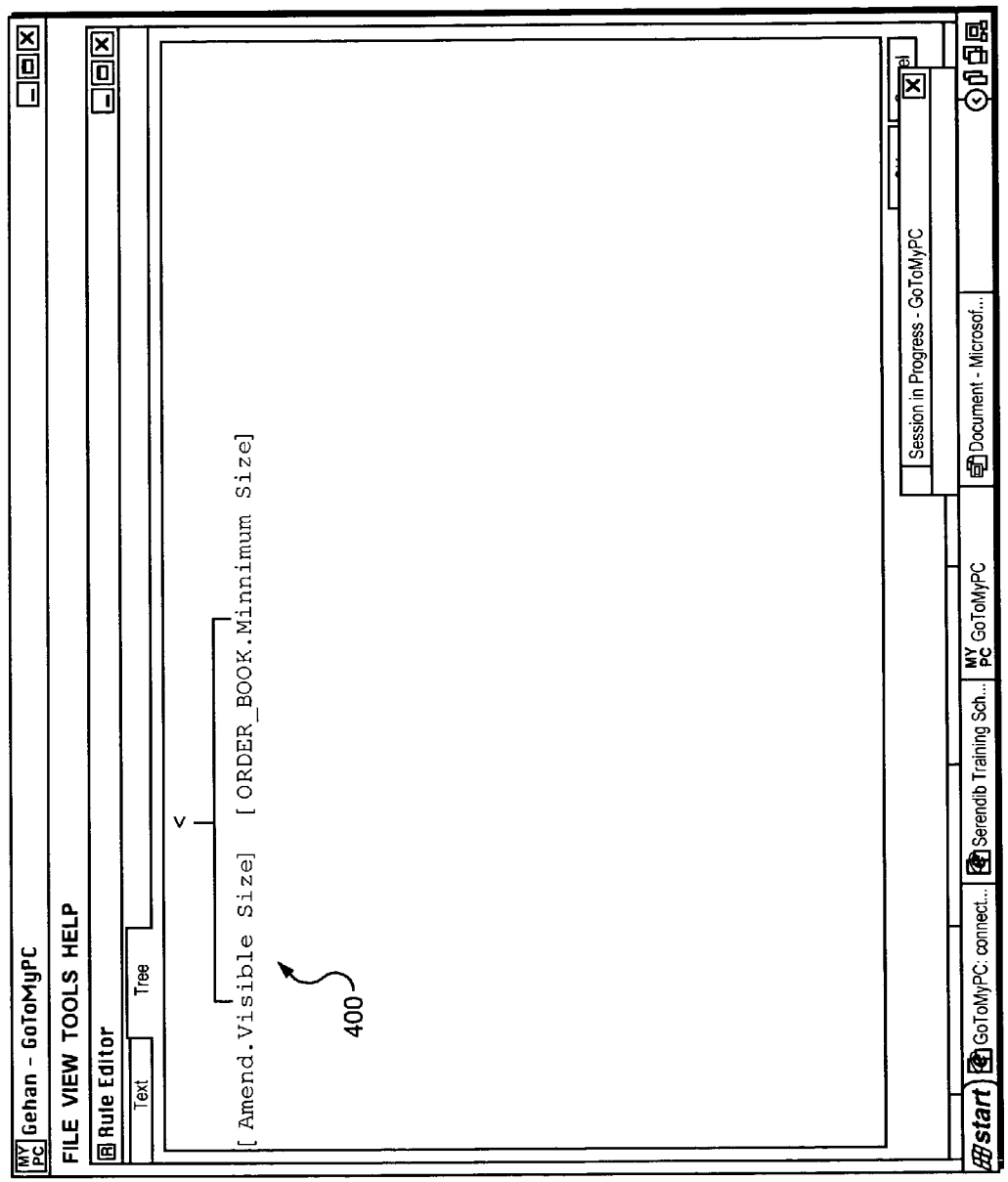

For the convenience of the user, the DBLRI generates a parse tree for each expression. Thereafter, the parse tree may be populated and used directly by the application program or the parse tree may be used to produce an associated DLL. As depicted in FIGS. 4A–B, the user may view the parse tree 400 that corresponds to a given rule by selecting the parse tree page using the button 100. The user may then determine from the parse tree diagram if the new rule operates as the user intended. As shown, the user may choose to include in the expression 36 the functional language "IS LESS THAN" which is selected from the list 62A of operators in the menu 60. Alternatively, the user may select the "<" operator from the header 80. Either way, the system produces the appropriate parse tree 400.

The DBLRI generates the parse trees using a highly recursive process. The process evaluates a given functional language expression to produce various sub-trees that contain, respectively, one or more branches or decision points, and then attaches the sub-trees to respective nodes to produce the main tree.

The DBLRI produces a sub-tree based on tokens that represent data types in the expression. We discuss first how the tokens are assigned, and then how the DBLRI uses the tokens to produce the sub-trees.

Figure 5A:
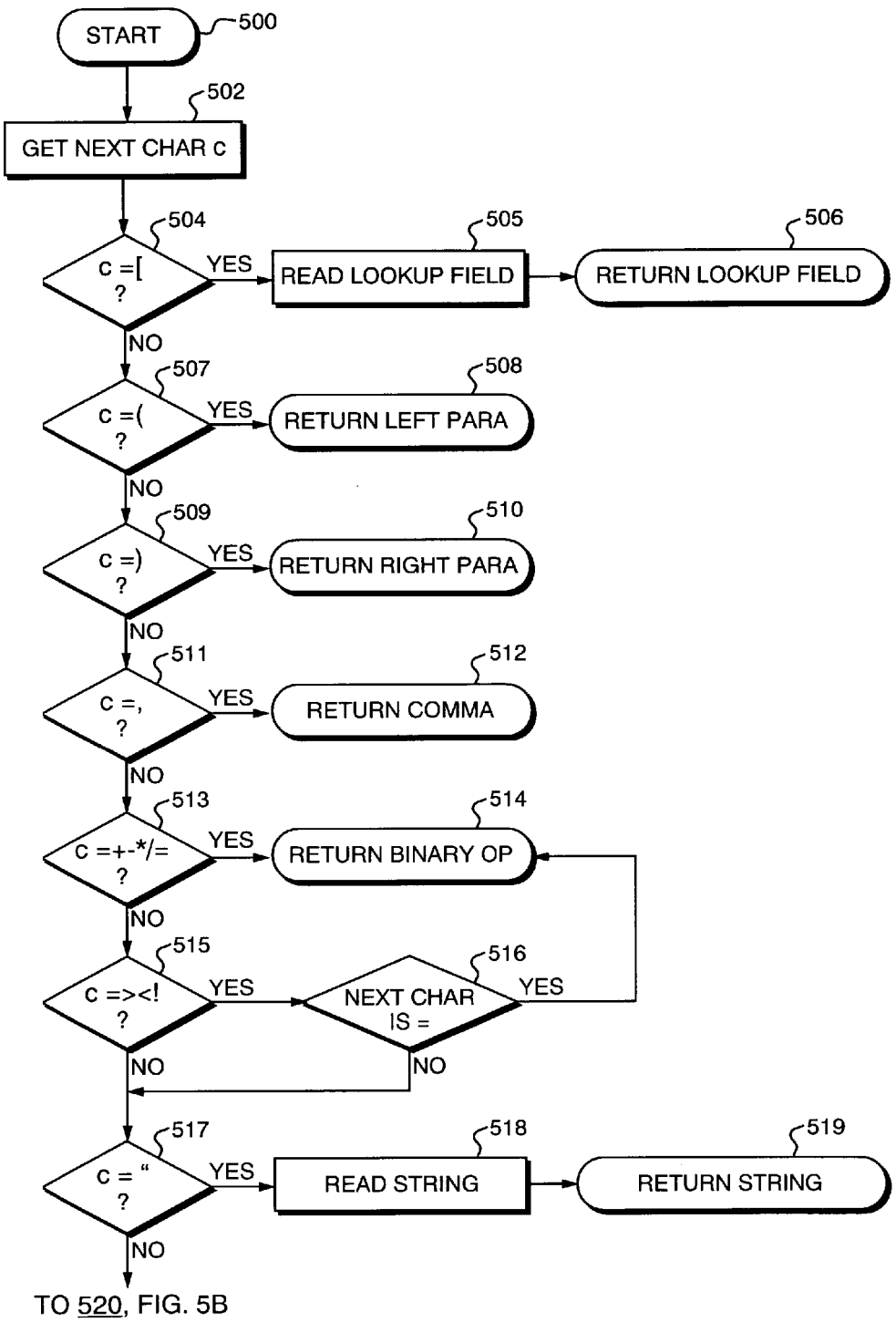
FIGS. 5A–15B are flow charts of various operations of the system associated with parsing the business logic rule expressions.
Figure 5B:
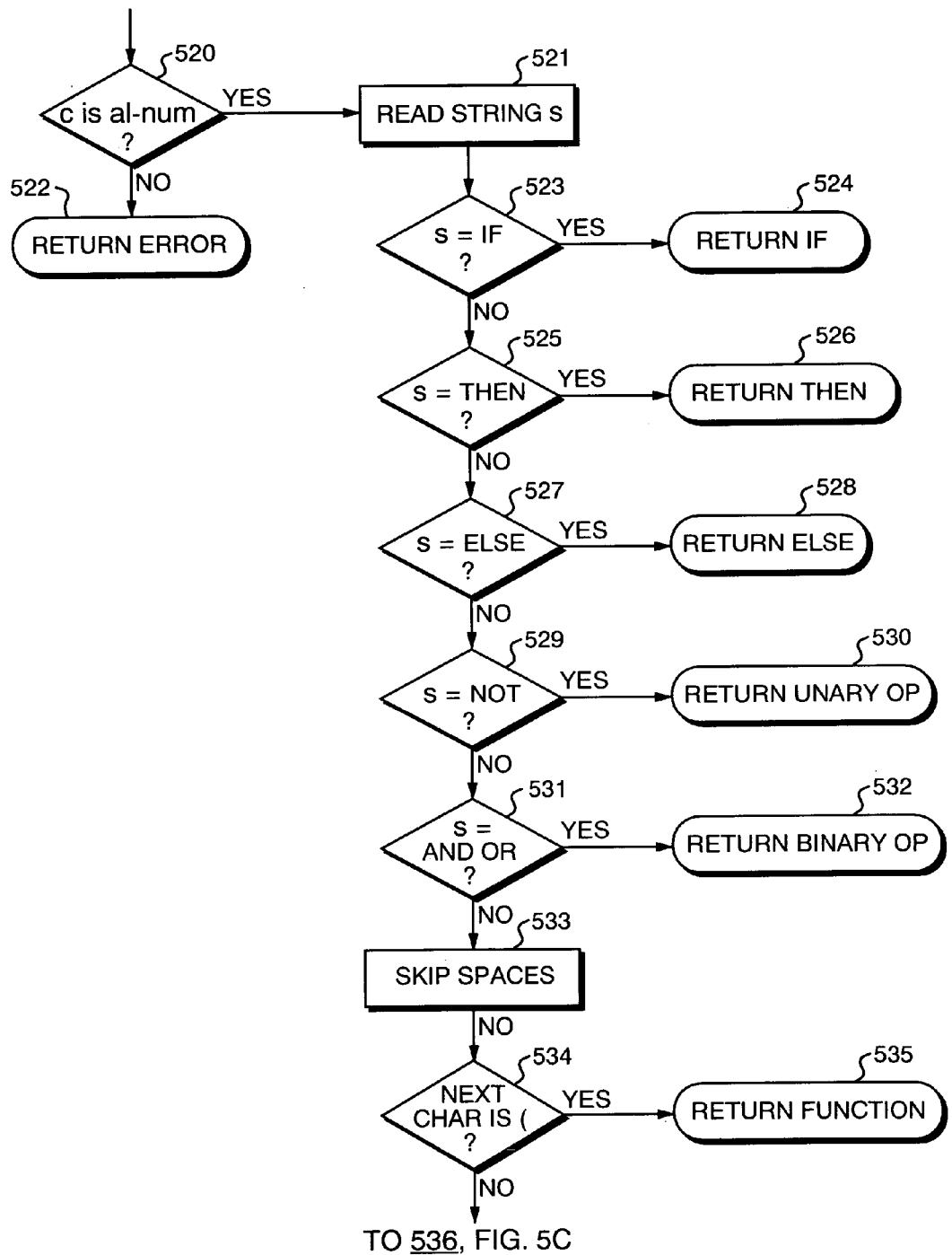
Figure 5C:
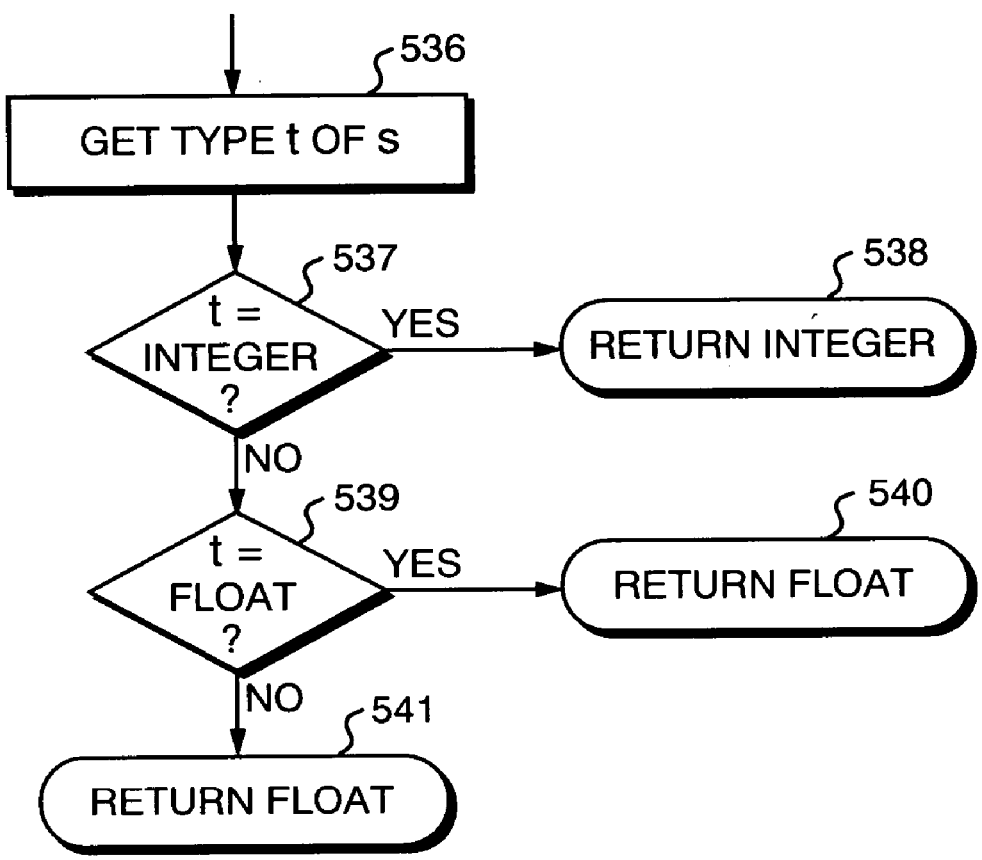
Figure 6A:
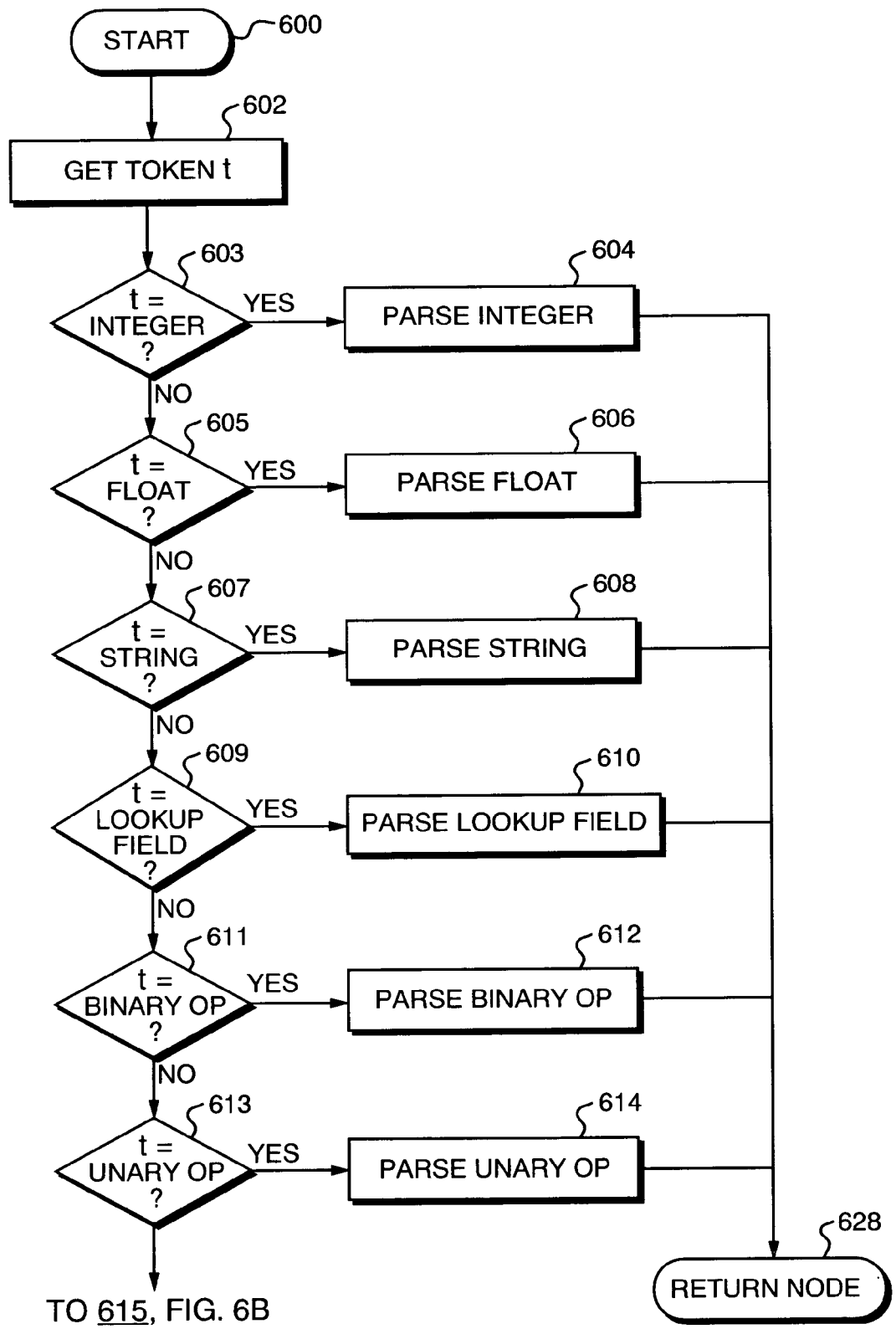
Figure 6B:
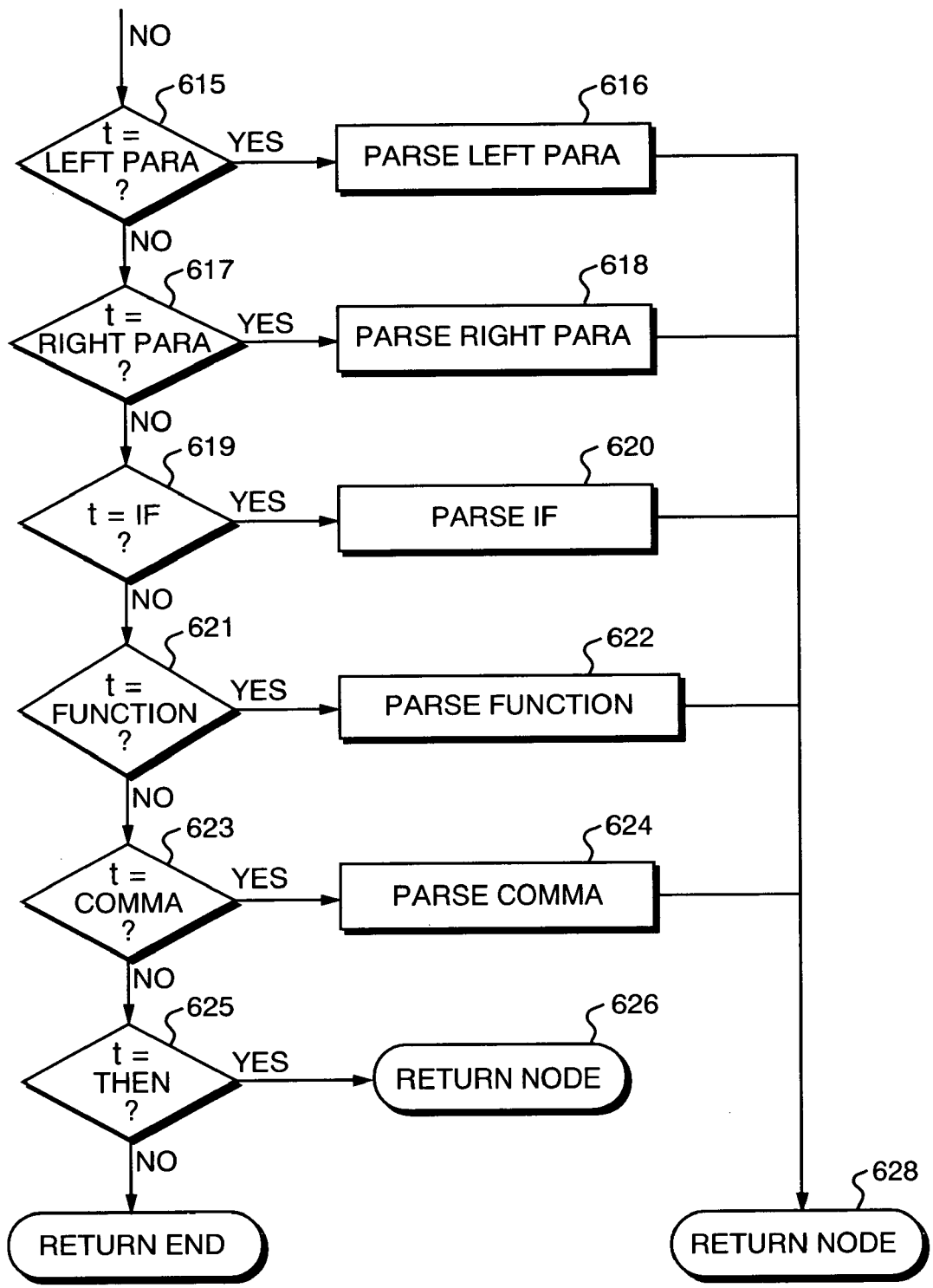

Referring now to FIGS. 5A–C, the DBLRI starts (step 500) the process of assigning a token by looking at a next character in the expression (step 502). The process iteratively determines what the character is, and thereafter assigns an appropriate token (steps 504–540). More specifically, the token-assigning process first determines if the character is a left bracket (step 504). A left bracket indicates that the next set of characters, that is, the characters between the left bracket and an associated right bracket, represent a look-up field that corresponds to a field or sub-field in the database 16 (FIG. 1). Accordingly, if the character is a left bracket, the process reads the associated lookup field name from the expression (step 505) and assigns, or returns, a corresponding lookup field token (step 506). When the process restarts with the next character in the expression, the process evaluates the character that succeeds the right bracket, that is, the character that follows the lookup field name.

If the character under evaluation is not a left bracket, the token-assigning process determines if the character is a left parenthesis (step 507). If so, the process returns a left parenthesis token (step 508). Otherwise, the process continues and next determines if the character is a right parenthesis. If the character is a right parenthesis, the process returns the appropriate token (steps 509–510). Otherwise, the process determines if the character is a comma and, if so, returns the corresponding token (steps 511–512).

If the character is not a bracket, parenthesis or a comma, the process determines if the character is a binary operator, that is, a plus sign, a minus sign, a multiplication sign, a division sign or an equal sign (step 513). If so, the process returns a binary operation token (step 514).

If the character under evaluation is not one of the listed binary operations, the process determines if the character is one of a greater than, a less than or an exclamation point symbol (step 515). If so, the process determines if a next character is an equal sign, and the two characters together thus represent a binary operation (step 516), in which case the process returns to step 514 and produces a binary operation token. Otherwise, the process continues, to determine if the character following one of the greater than, less than or exclamation point symbols is instead a quotation mark (step 517) or an alphanumeric (step 520), which indicate the start of respective strings. If not, the process determines that the original character cannot be identified, and the process returns an error message (step 522). The process also performs the steps 517–522 if the character, in step 515, has not yet been identified.

If the character under evaluation indicates the start of a string, that is, if the character is a quotation mark or an alphanumeric, the process reads the string (steps 518, 521) and, as appropriate, returns a corresponding string token (steps 519, 541). If, however, the string is a statement, i.e., "IF", "THEN", or "ELSE", the process returns an appropriate statement token (steps 523–528). If the string instead represents an operation, i.e., "NOT" or "AND OR," the process returns the appropriate unitary or binary operator token (steps 529–532). Otherwise, the process determines, after skipping spaces (step 533), if a next character in the expression is a left parenthesis (step 534). If so, the process identifies the string under evaluation as a function, and the process returns a corresponding function token (step 535).

If the string following an alphanumeric has not been identified as a statement, operator or function, the process, in step 536, consults a table (not shown) to determine the string type. If the string represents an integer or a floating point value, the processor returns the appropriate token for the integer or floating point value (steps 537–540). Otherwise, the process returns the string token (step 146) as discussed above.

Once the tokens are assigned to the expression, a token binding process associates the tokens that relate to the same operations or functions. The token binding process thus associates the tokens representing operands with the operation token. Further, the process binds the tokens representing particular values with the appropriate function token, and so forth.

The token binding process starts at the left-hand side of the rule expression and determines the position of a first function or operation token. The process then associates with the function or operation token the tokens that represent the respective operands or values. For example, the process binds to a binary operator token the tokens that represent the two integers, floating point values, lookup table values, and/or functions that represent the associated operands. As necessary, the token binding process performs the same steps for operations and functions that are performed to produce the various operands, and so forth. Each grouping of tokens represents a sub-tree.

The system next produces sub-trees for the various operations, functions and so forth, by parsing the sub-expressions that are represented by various groupings of tokens.

Referring now to FIGS. 6–16, the sub-tree parsing process starts (step 600) with a given token and performs a series of checks to determine what data type the token represents.

In step 603\*\* the process determines if the given token is an integer token. If so, the sub-tree procedure parses the integer, as discussed below with reference to FIG. 7 to produce an integer node, and the integer node is returned to the sub-tree process (step 628).

If the token is not an integer token, the sub-tree procedure checks if the token is a floating point value token, a string token and so forth (steps 605–627). When the token type is identified, the process, with one exception, performs the appropriate parsing sub-process, and returns the associated node. The one exception relates to a THEN token, in which case the sub-tree process returns a THEN node directly to the sub-tree process (step 626).

Figure 7:
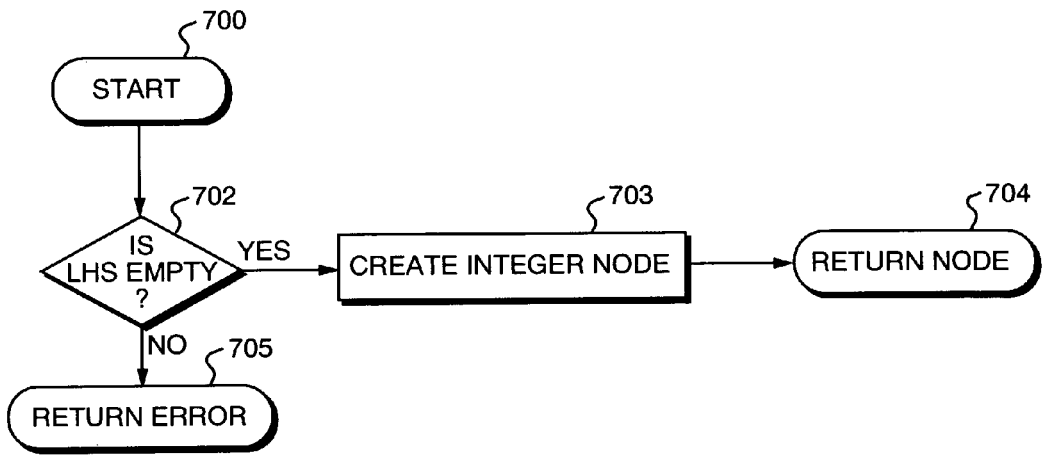
Figure 8:
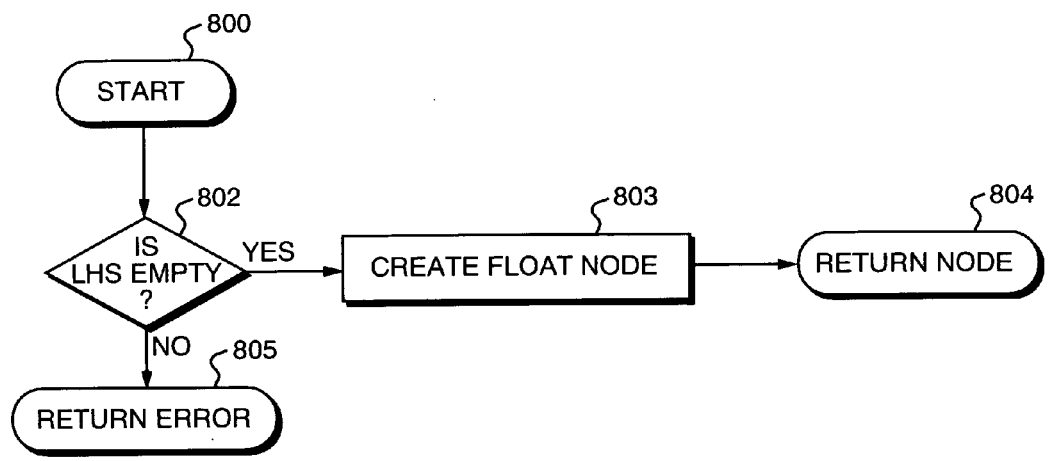
Figure 9:
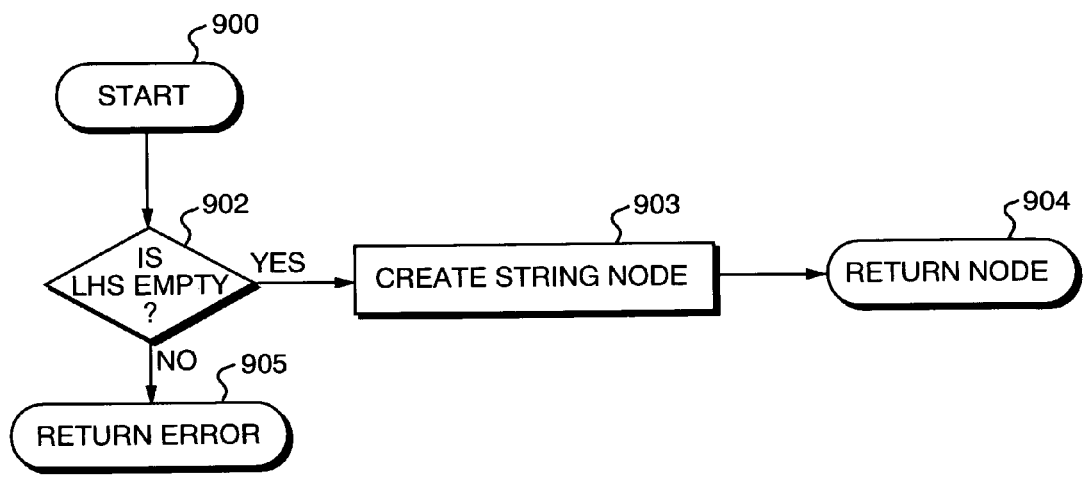

Referring now to FIGS. 7, 8 and 9, when the token represents a data type that is a parameter value, such as an integer, a floating point numeral, or a string, the system starts a sub-process to parse the data type (steps 700, 800, 900) by checking that the left hand side, that is, the path in the tree that leads from the integer is empty (steps 702, 802, 902). If not, that is, if the integer in not a leaf in the associated branch of the sub-tree, the process returns an error message (steps 705, 805, 905). Otherwise, the system creates the appropriate integer, floating point or string node (steps 703, 803, 903), and the node is returned to the sub-tree process (steps 704, 804, 904).

Figure 10:
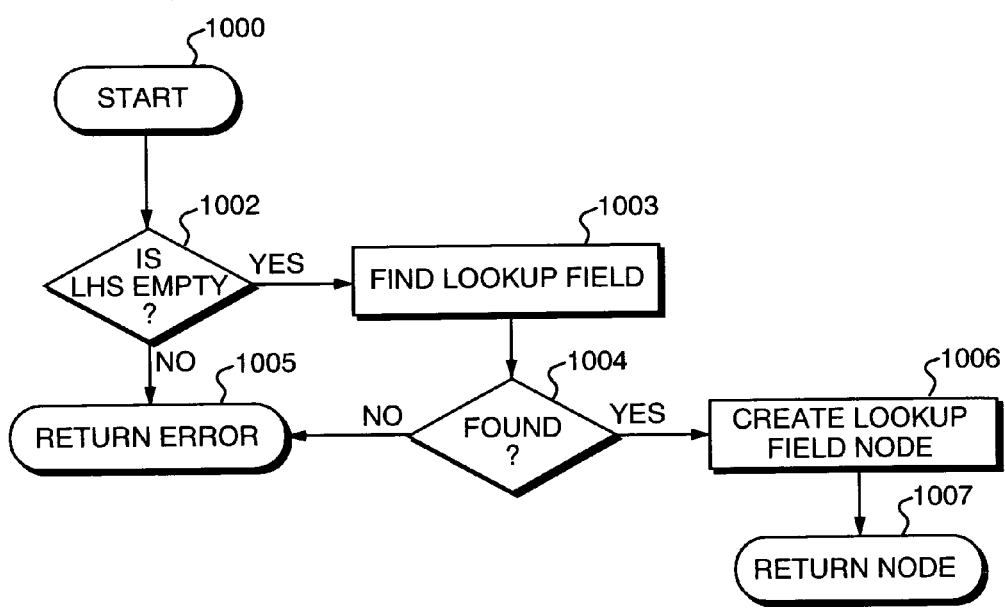

Referring now to FIG. 10, when the process starts a sub-process that parses a lookup field data type (step 1000), the sub-process checks that the left-hand side or the path that leads from the lookup field is empty (step 1002). If not, the sub-process returns an error message (step 1005). If the left hand side is empty, the sub-process uses the pointers or other information bound to the lookup field token and checks that the associated lookup field can be found (step 1004) in, for example, the data base 16 (FIG. 1). If the lookup field can be found, the sub-process creates an associated lookup field node and returns the node to the sub-tree process (steps 1006, 1007). Otherwise, the sub-process returns an error message (step 1005).

Figure 11:
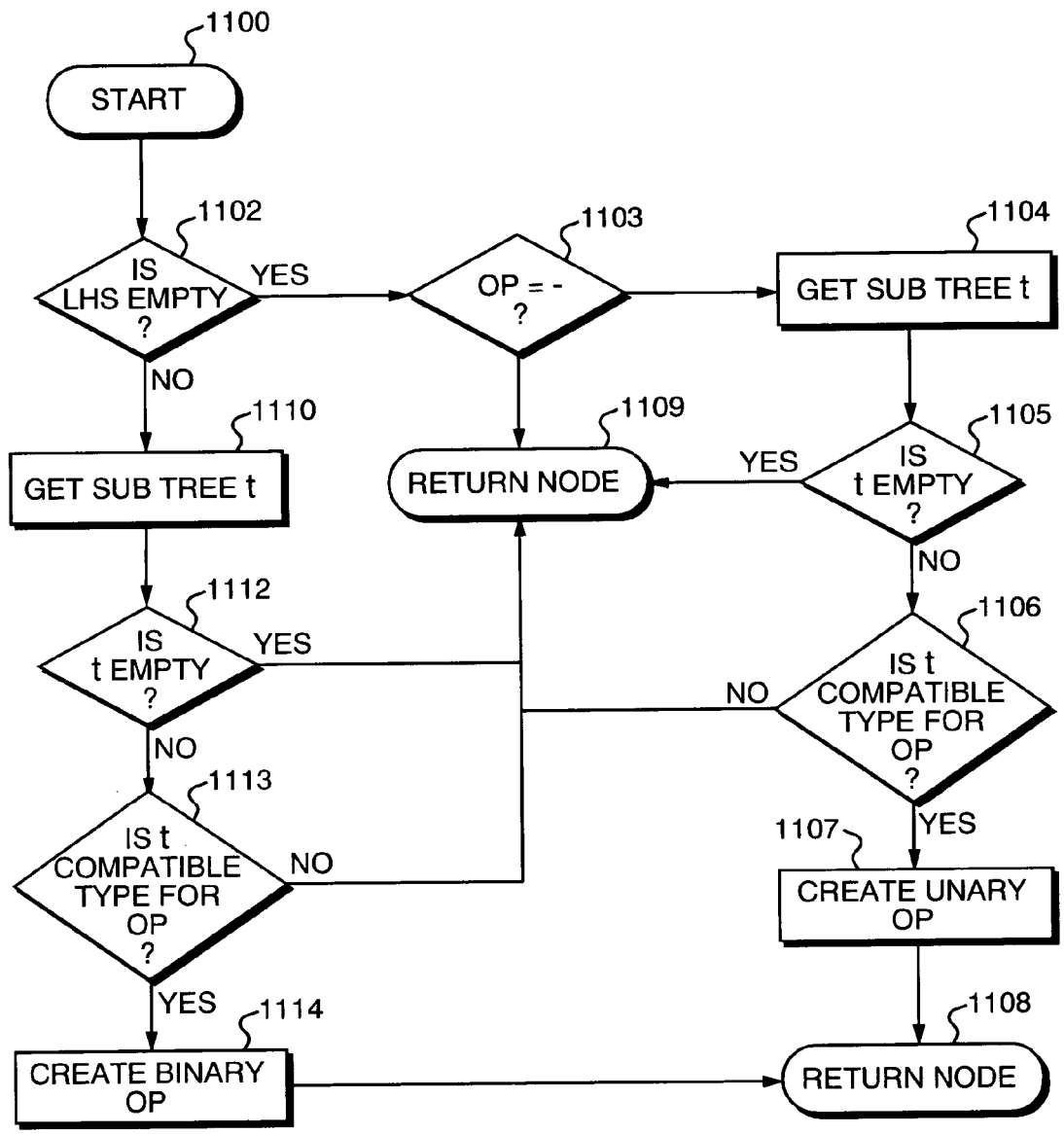

Referring now to FIG. 11, a binary operator parsing sub-process starts (step 1100) by checking if the left-hand side, or path, is empty (step 1102). If so, the process next checks if the sub-expression is a negative operation, i.e., if the operator produces the negative of the given value. If so, the process gets the associated sub-tree, that is, the sub-tree that represents the associated operand (step 1104). The process then checks whether the sub-tree is empty (step 1105), and if so, the process returns an error (step 1109). Otherwise, the process determines if the sub-tree type is compatible with the negative operator (step 1106), and if so, the process creates an associated unary operation node (steps 1107, 1108).

If the left-hand side of the binary operator is not empty, the processor gets the appropriate sub-tree and determines whether to send back an error or create and return a binary operator node (steps 1110–1114).

Figure 12:
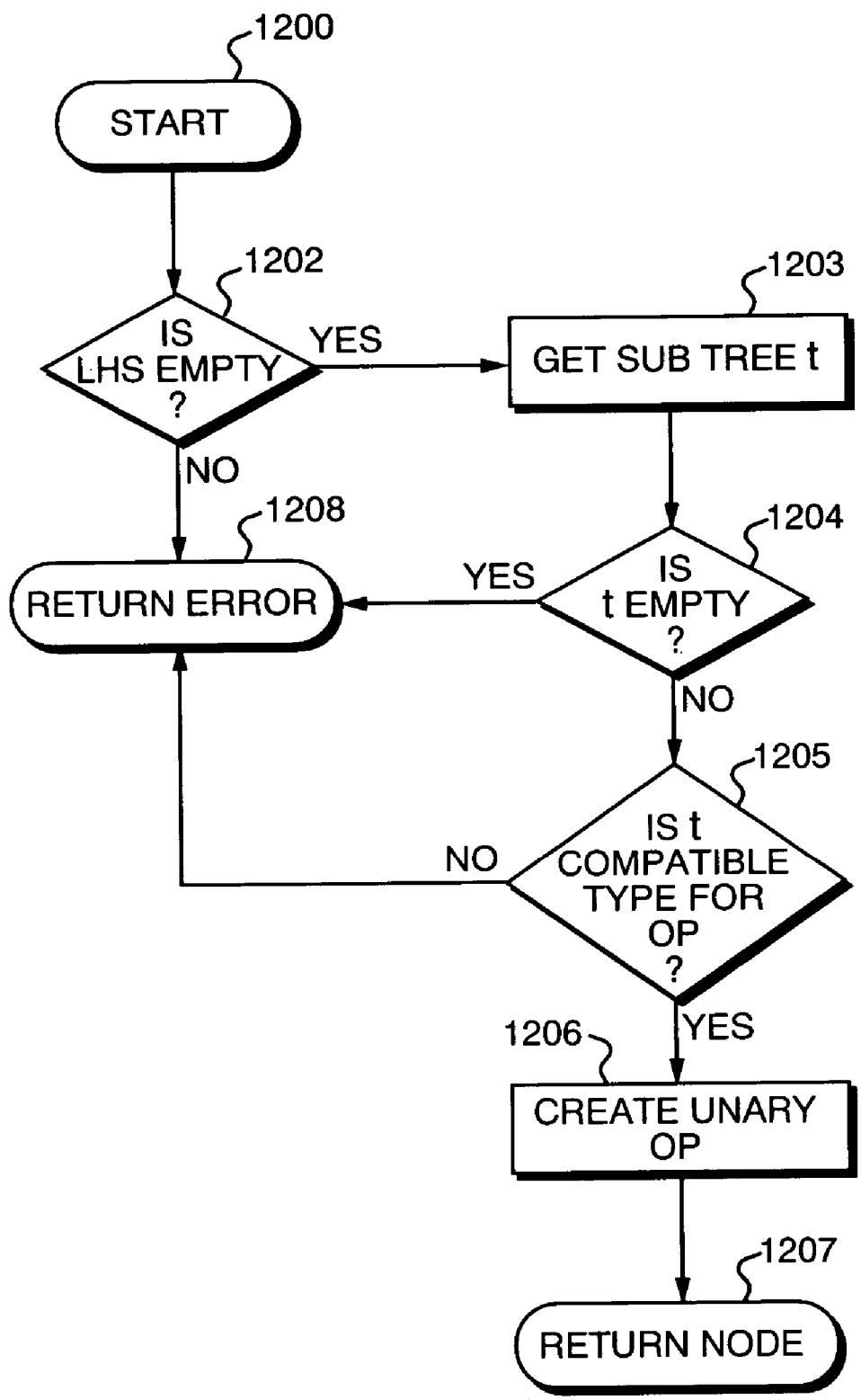

FIG. 12 is a flow chart of the sub-process for parsing a unary operator. The procedure begins in step 1200 and checks if the left-hand side or path is empty. If the left-hand is empty, the sub-process returns an error (step 1208). Otherwise, the sub-process obtains an associated sub-tree, that is, the sub-tree that represents or produces the value on which the unary operator acts (step 1203). The process then tests the sub-tree (step 1204) to determine if the sub-tree is empty. If the sub-tree to is empty, the sub-process returns an error (step 1208). Otherwise, the sub-process determines, in step 1205, if sub-tree t is compatible with the type of unary operation to be performed. If the sub-tree is not compatible, the procedure returns an error (step 1208). Otherwise, the sub-process creates a unary operator node and returns the node to the sub-tree process (steps 1206, 1207).

Figure 13:
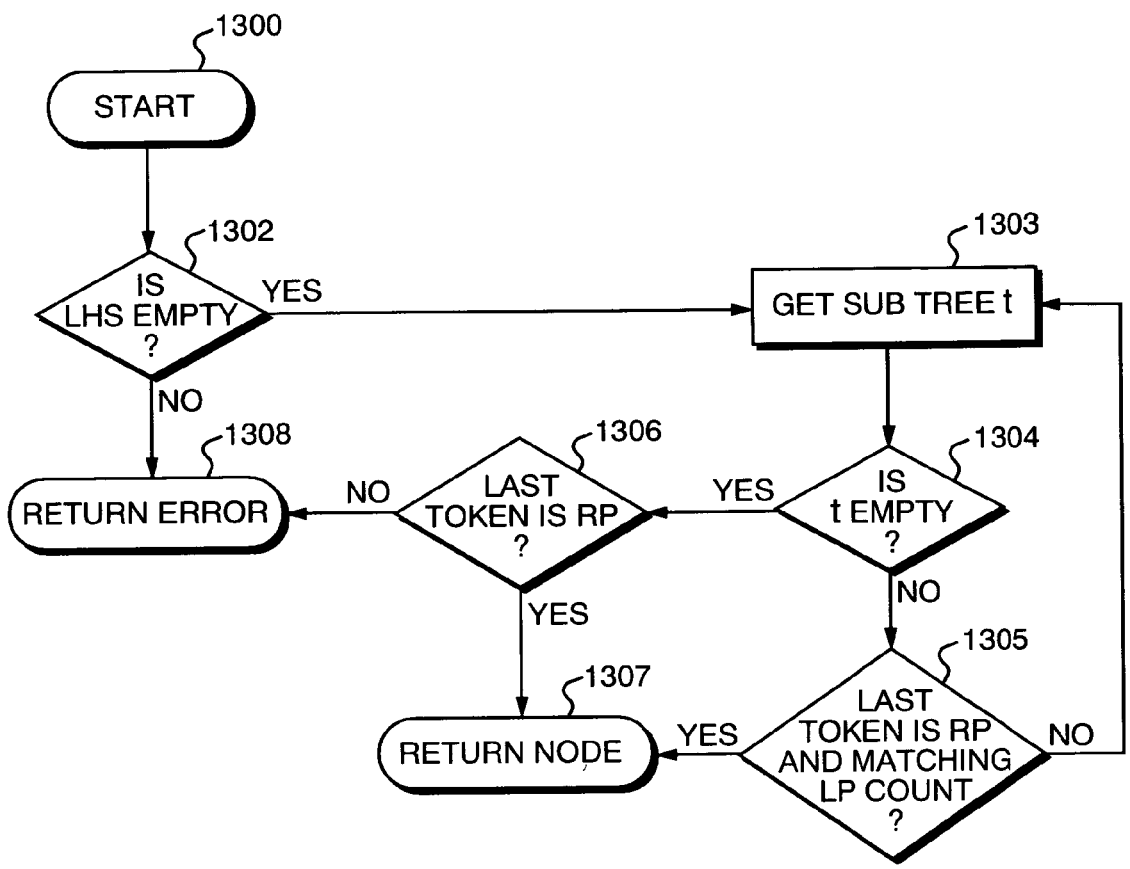

FIG. 13 is a flow chart of the sub-process for parsing a left parenthesis. The sub-process begins in step 1302 and determines if the left-hand side or path is empty. If the left-hand side is empty, the sub-process returns an error (step 1308). Otherwise, the sub-process obtains the associated sub-tree t, which represents what occurs next in the underlying expression (step 1303). The sub-process then checks to determine if the sub-tree is empty (step 1304). If the sub-tree t is empty, the sub-process determines if the last associated token is a right parenthesis (step 1306). If not the sub-process returns an error (step 1308). Otherwise, the sub-process returns a node (step 1307).

If the sub-process determines that the sub-tree t is not empty, the sub-process determines if the last token was a right parenthesis and also if the number of right and left parentheses match (step 1305). If so, the sub-process returns a node (step 1307). Otherwise, the procedure branches back to step 1303 and obtains a next sub-tree t. The sub-process then repeats steps 1304–1308.

Figure 14:
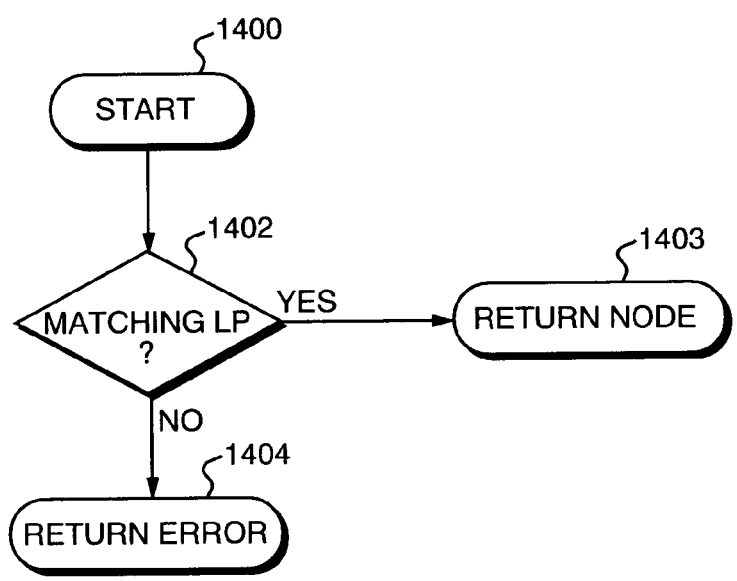

FIG. 14 is a flow chart of the steps involved in parsing a right parenthesis. The sub-process begins in step 1400 and determines if there is a matching left parenthesis (step 1402). If there is a matching left parenthesis, the sub-process returns a node (step 1403). Otherwise, the sub-process returns an error (step 1404)

Figure 15A:
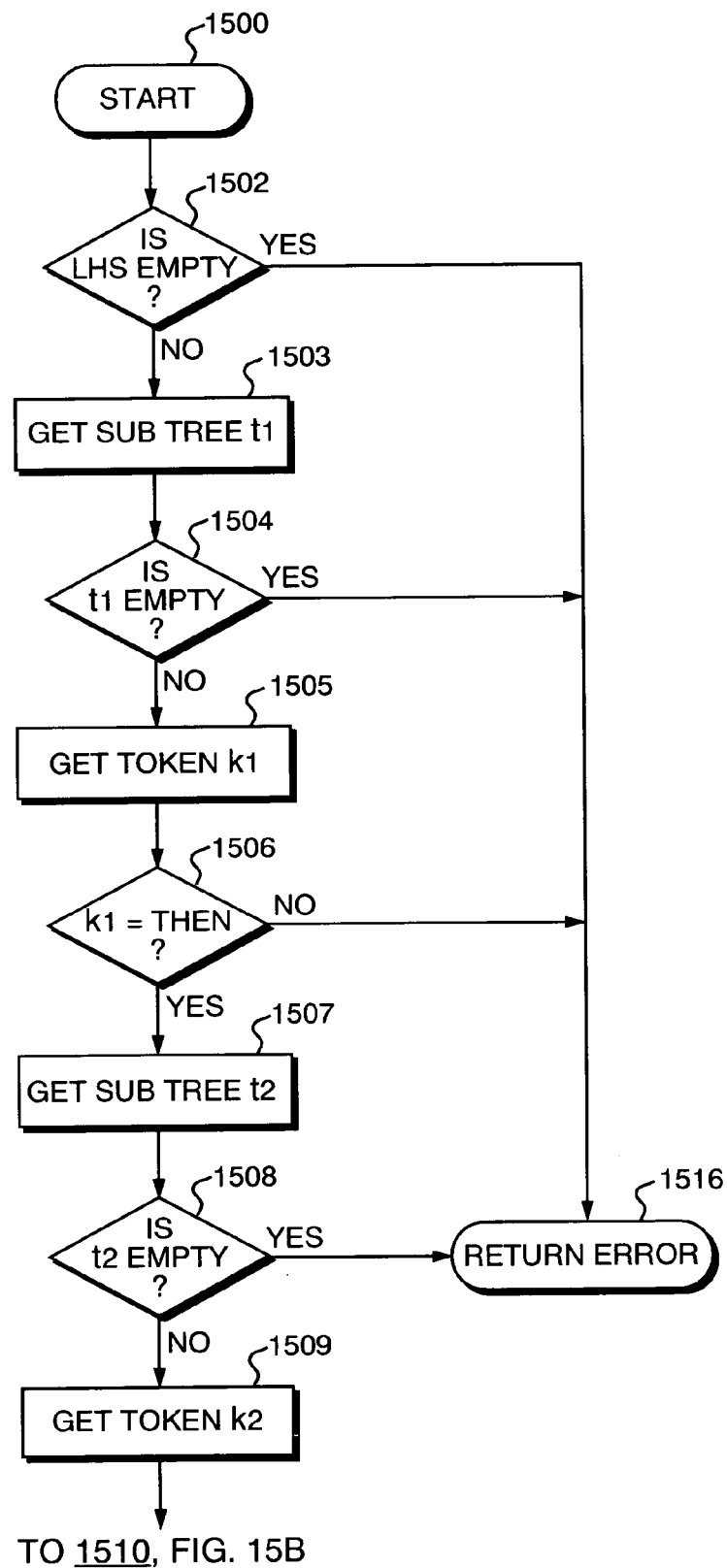
Figure 15B:
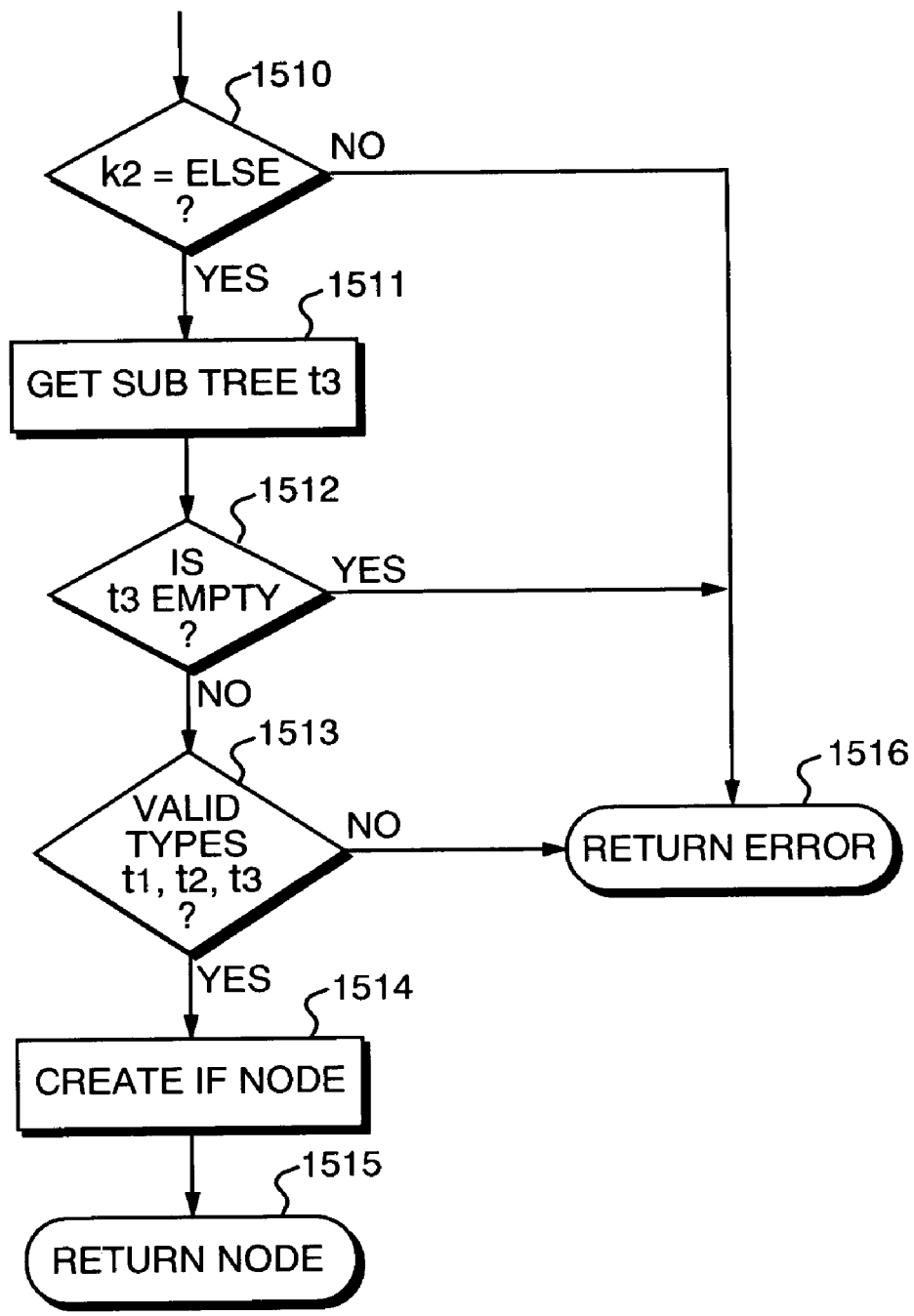

Referring now to FIGS. 15A–B, a parsing sub-process for an IF statement starts at step 1500 and determines, at step 1502, if the left-hand side or path is empty. If so, the sub-process returns an error (step 516). If the left-hand side is not empty, the sub-process obtains a first associated sub-tree (step 1503). The sub-process next checks if the first sub-tree is empty (step 1504). If so, the sub-process returns an error (step 516). Otherwise, the sub-process attaches the sub-tree and obtains a next associated token, which should be a THEN token (steps 1505 and 1506). If the associated token is not a THEN token, the sub-process returns an error (step 1516). Otherwise, the sub-process obtains a next associated sub-tree (step 1507).

The sub-process determines if the next sub-tree is empty, and if so, returns an error (step 1508, 1516). If the sub-tree is not empty, the sub-process attaches the sub-tree and obtains a next associated token. The process determines if this next token is an ELSE token (steps 1509, 1510). If the token is not an ELSE token, the sub-process returns an error (step 1516). Otherwise, the sub-process gets a next associated sub-tree and the process determines if the sub-tree is empty (steps 1511, 1512). If the sub-tree is empty, the sub-process returns an error (step 1516). Otherwise, the sub-process attaches the sub-tree, and the process then determines if the attached first, second and third sub-trees all represent valid statements. If so, the sub-process creates an IF node and returns the node to the parse tree process (steps 1513–1515). If the sub-trees do not represent valid statements, the sub-process returns an error (step 1516).

Figure 16A:
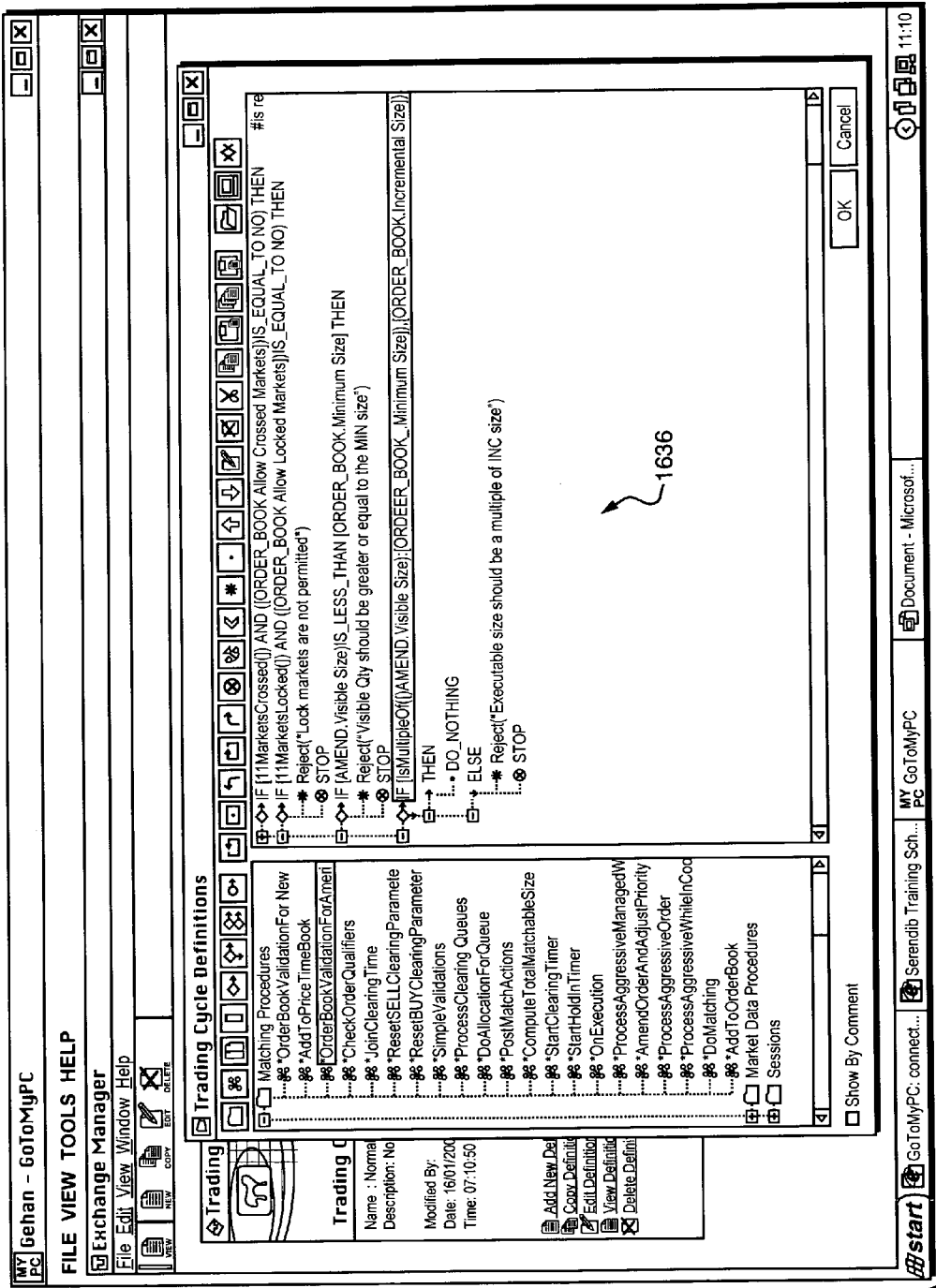
FIGS. 16A–19B are screens that illustrate various other operations of the system of FIG. 1.
Figure 16B:
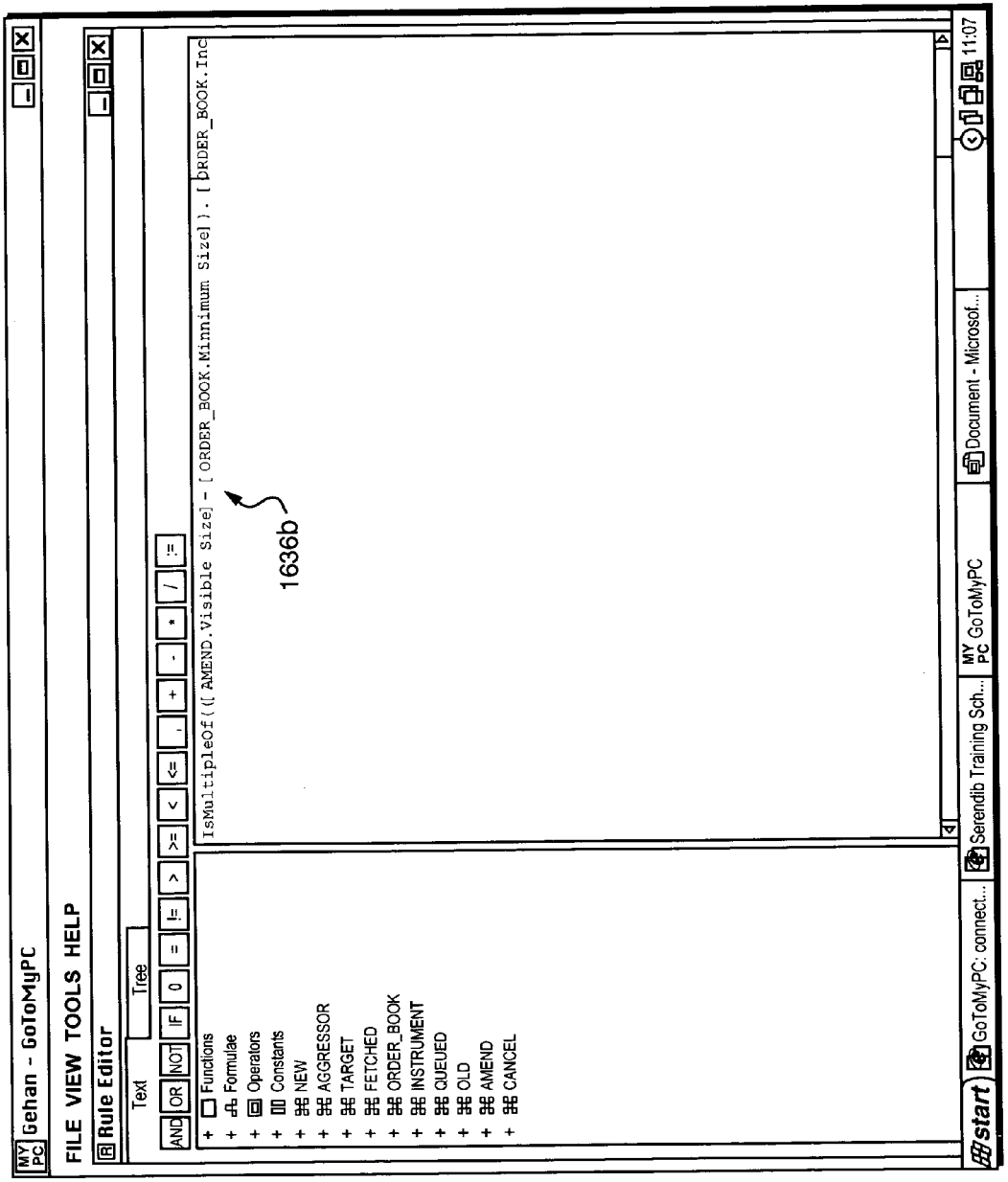
Figure 16C:
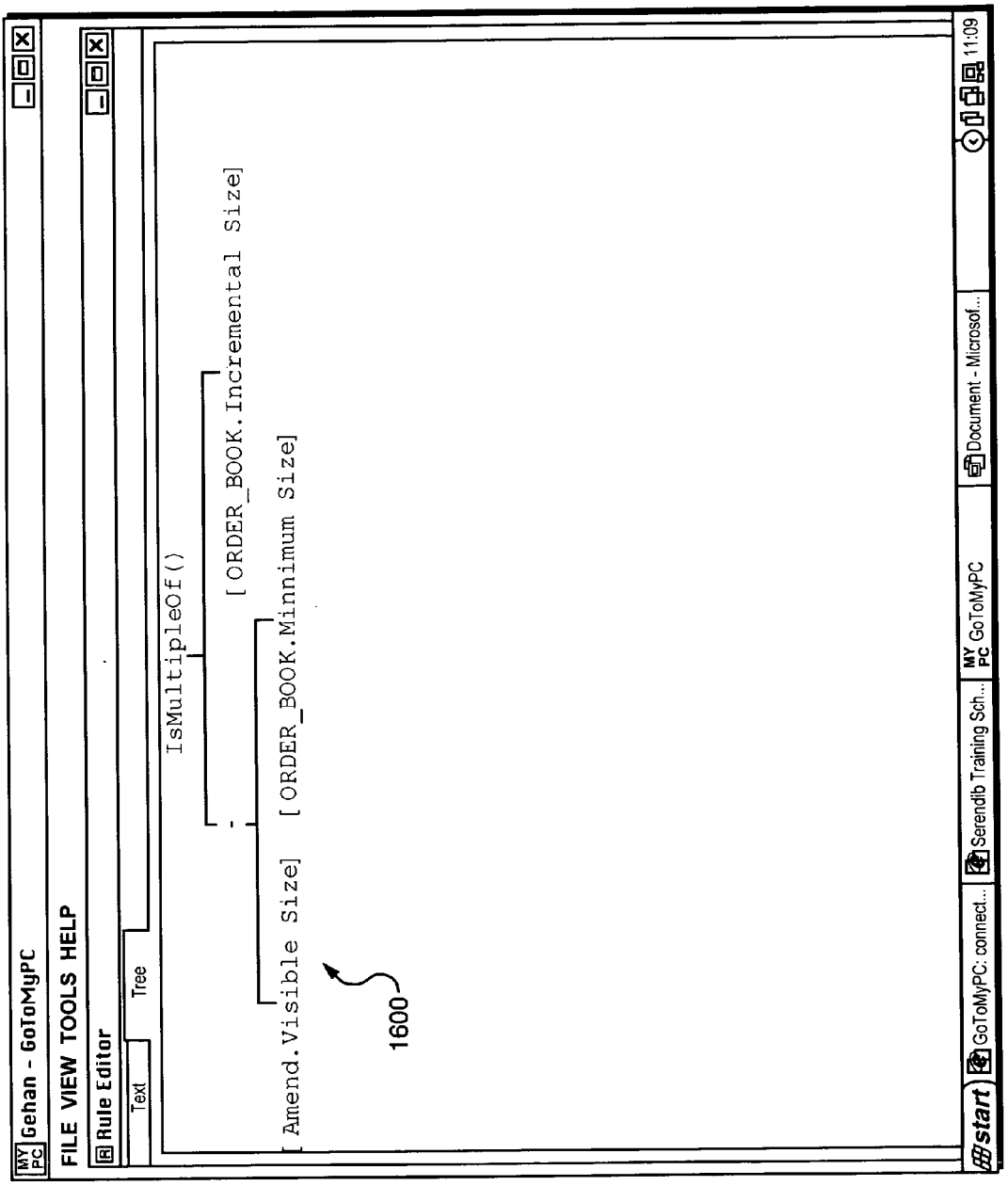

A token representing a function is associated with a corresponding pre-coded routine. The function token is also bound to tokens representing the various values required by the function. Accordingly, the parsing process for a function token determines if the various associated values are compatible with the function type. If so, the parsing of the function is complete and a parse tree is produced. FIGS. 16A–C depicts a parse tree 1600 for the function 1636B listed in FIG. 16B. As shown in FIG. 16A, the function is part of an expression 1630 that defines a trading cycle. Otherwise, an error is retained.

The DBLRI also incorporates other changes to the business operations into the application, without requiring the re-writing or re-compiling of the application software. For example, the DBLRI allows the user to re-define parameters, and thus handle underlying business operations that are expanded to include, for example, the trading of a new type of security. The DBLRI incorporates the new security in various existing business logic rules by essentially enlarging the scope of the associated parameters. Further, the DBLRI incorporates associated new and/or updated rules in the manner discussed above.

As an example, the financial services company adds treasury bills to the trades in which the company has been handling for some time. The system then adds to the database, via dynamic schema, new fields and sub-fields that are related to the treasury bills. In addition, the system links the new fields and sub-fields to the appropriate parameters and/or the appropriate sets of parameters available for use in the applicable categories of rules, such as, validation, trading, and so forth, so that the user can include these parameters in new or edited rules. The system also re-defines specific parameters that are included in existing rules by adding the new database fields and sub-fields to associated tables that essentially link the parameters with the database 16 (FIG. 1). The existing validation rules, matching rules and so forth can then be used, as is, to control the aspects of the trading of the treasury bills that are the same as the trading of other types of securities.

The DBLRI also allows a user to define new data objects within pre-defined data types, and thus, create new defined terms or keywords. The data types are established when the system is set up, with the fields both required and, as appropriate, optional specified. The user may thereafter define new terms, by selecting the information that specifies the applicable criteria. The newly defined keywords are then linked to the appropriate rules and so forth in the same manner as the previously defined keywords.

Figure 17A:
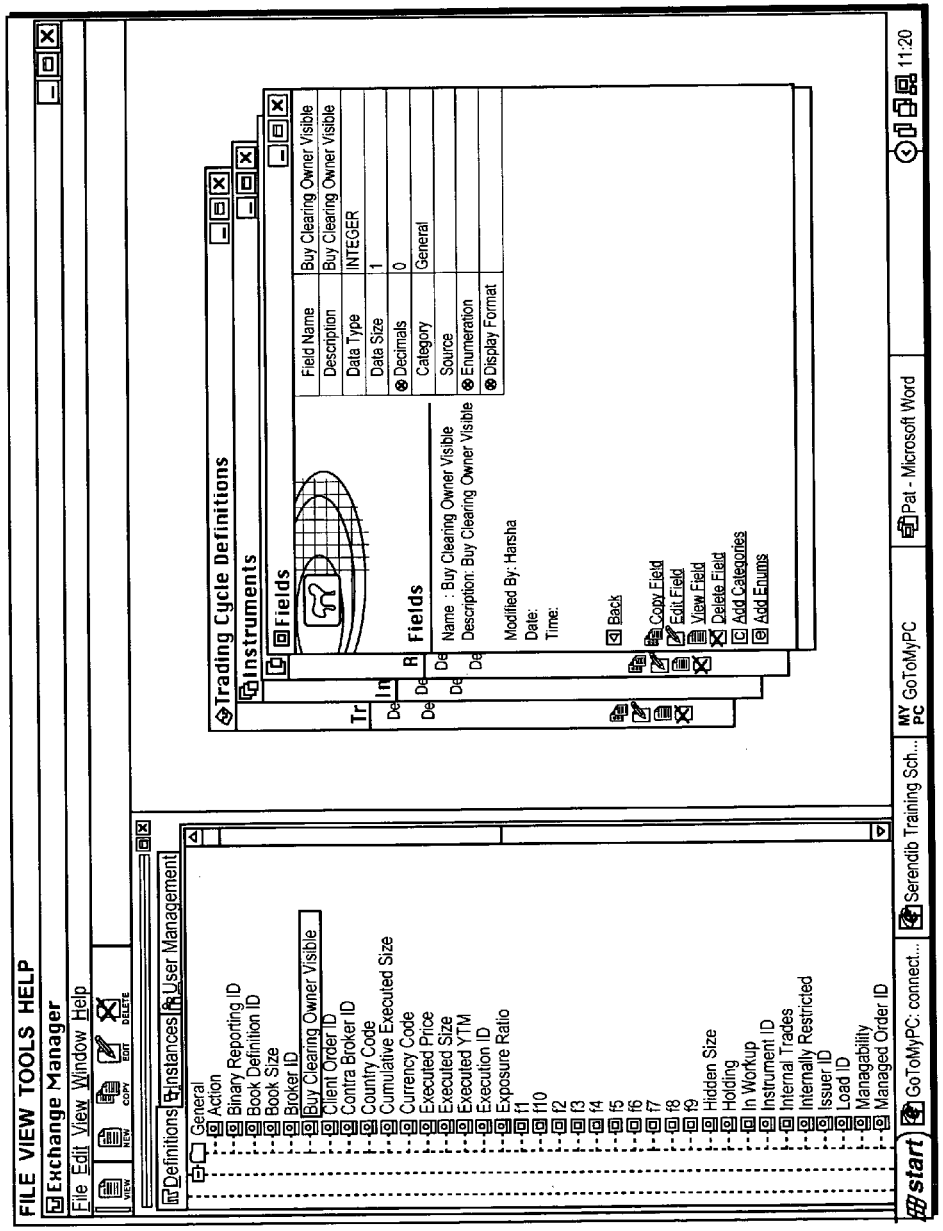
Figure 17B:
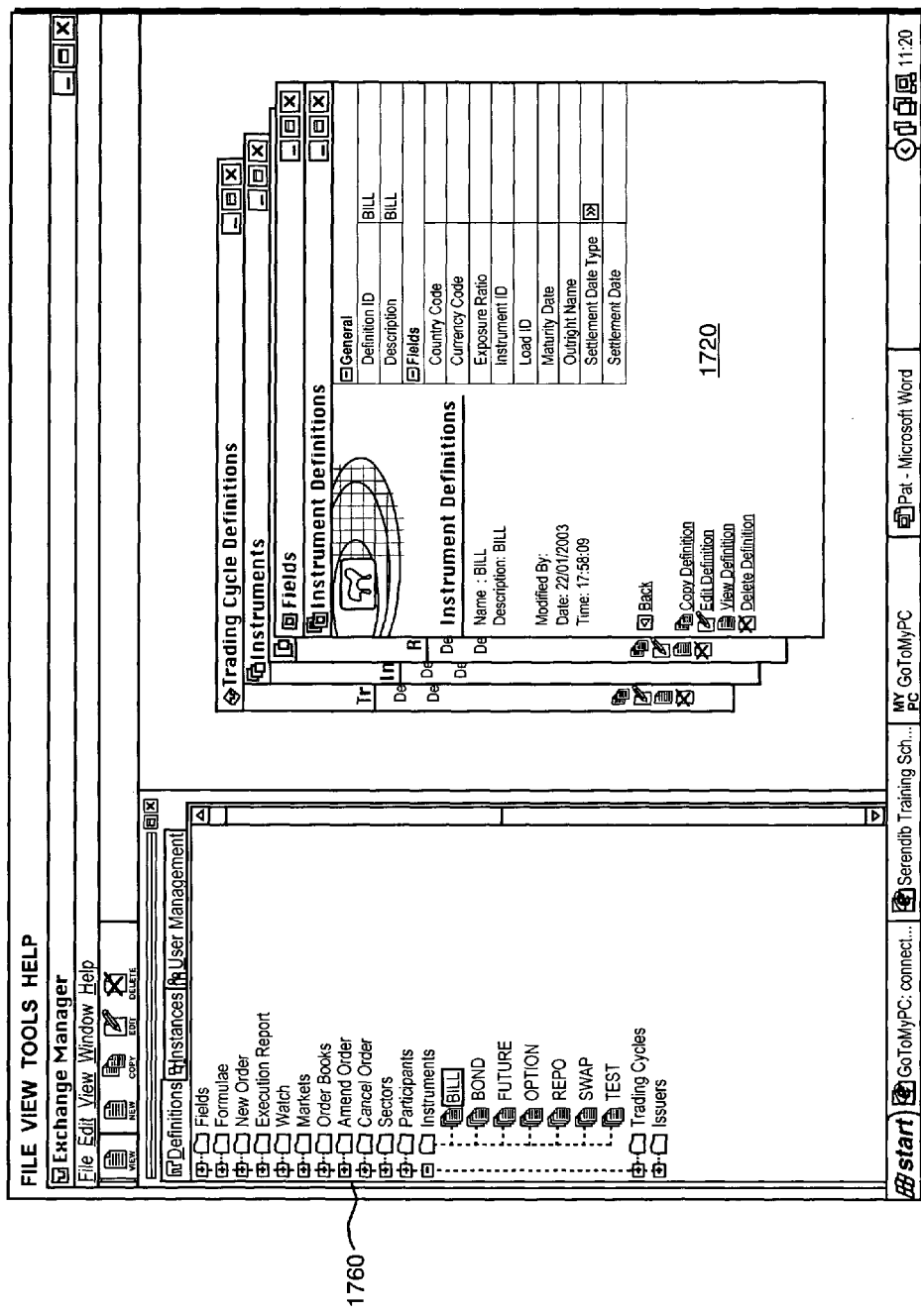

Referring now to FIG. 17, the user opens a window in the category "Instruments" for the data type "BILL" by clicking on the appropriate item in menu 1760. The user adds a newly defined object, that is, a new bill, to the data type by entering a new definition ID in the appropriate block of GUI 1720, and specifying information associated with the fields of the new data type. The newly defined data object, in the example, the new bill, is then made available for inclusion in various old and new rules by including the new bill in the various tables that are associated with the rules and listing the new bill as a parameter that is available for use by the various categories of rules.

Figure 18:
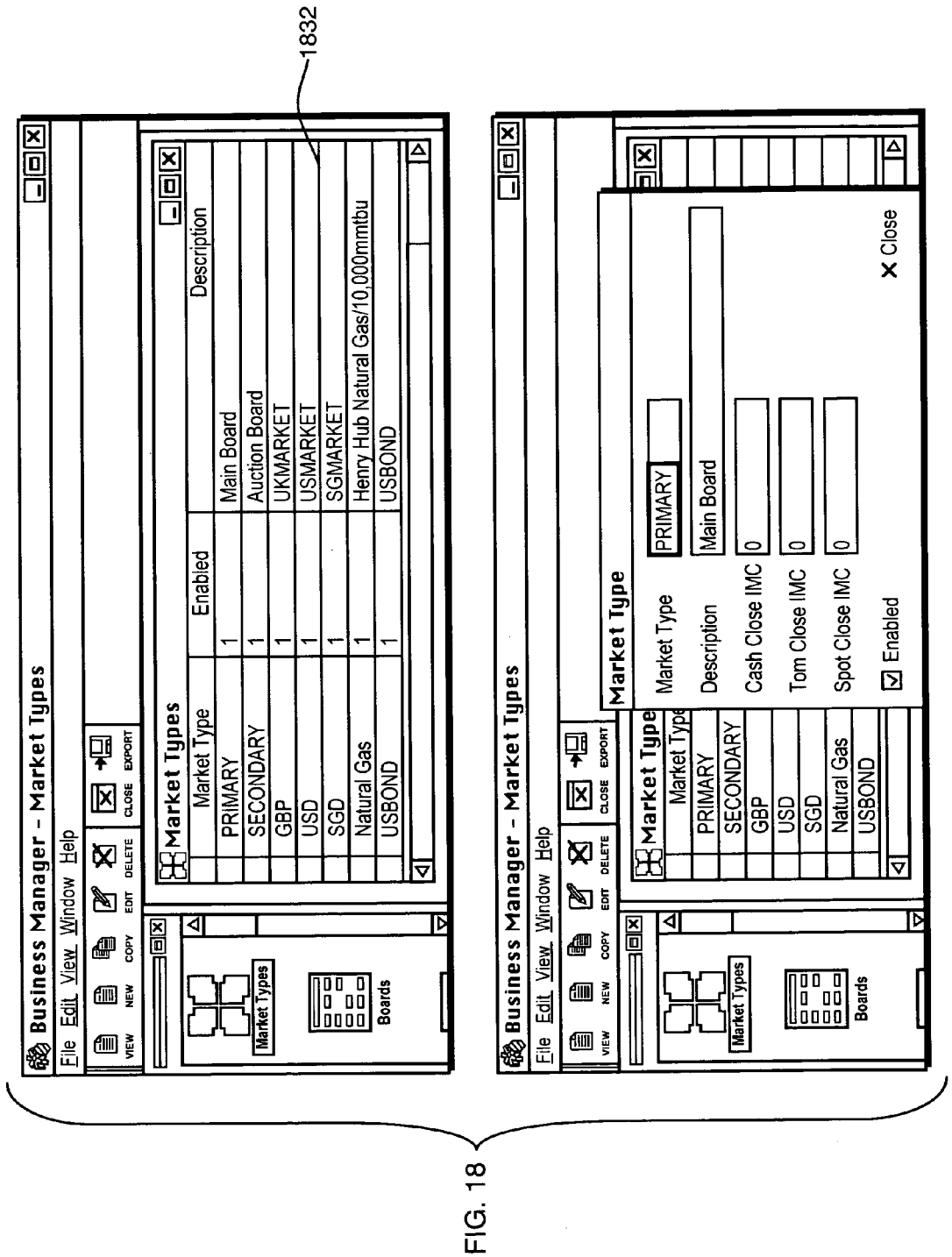

Similarly, the boards on which trading occurs may be changed and/or trading limitations added or removed by editing the definitions included in the category market types. Thus, as depicted in FIG. 18, various markets may be added to or deleted from the business operations by enabling or disabling the appropriate entries in the table 1832.

Figure 19A:
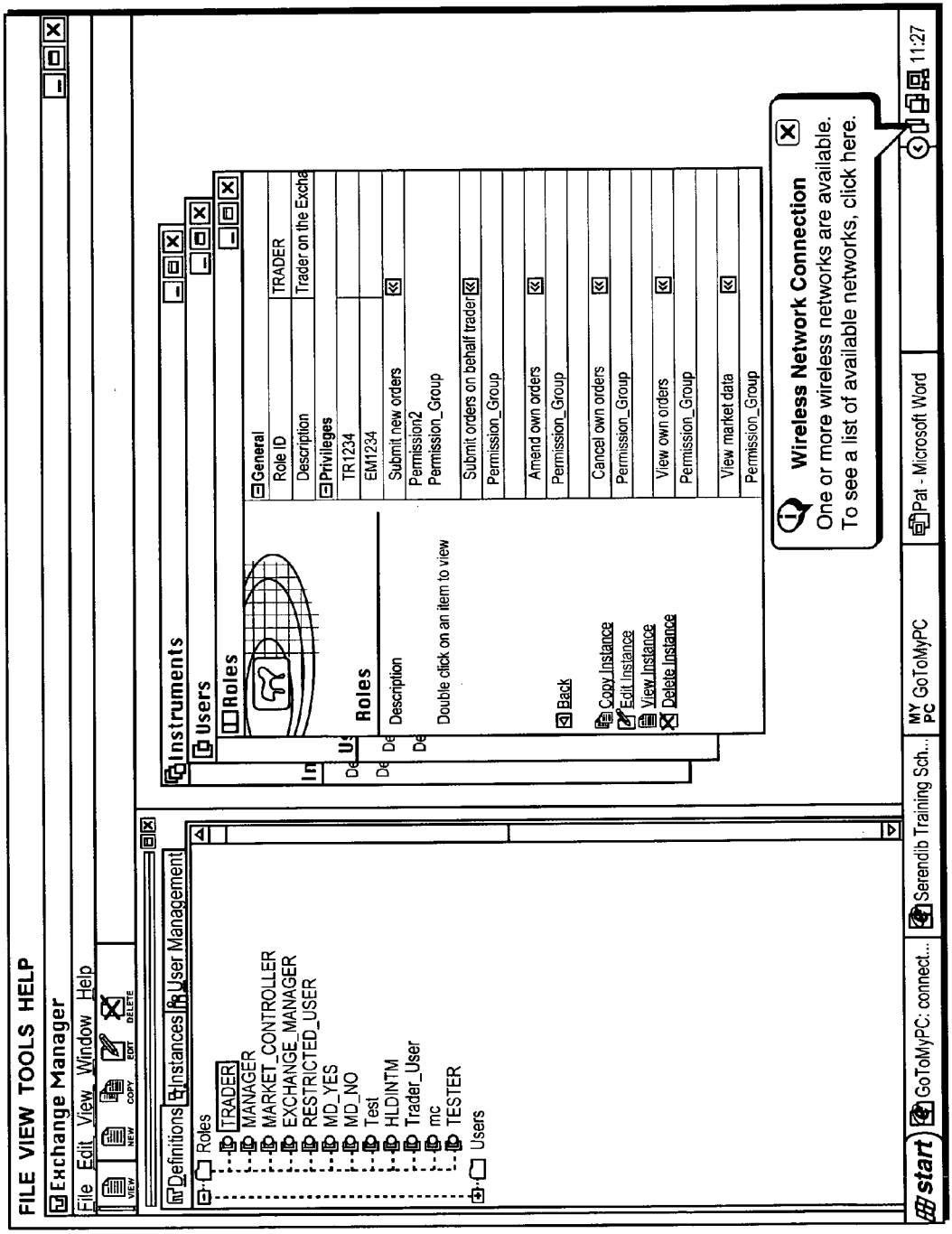
Figure 19B:
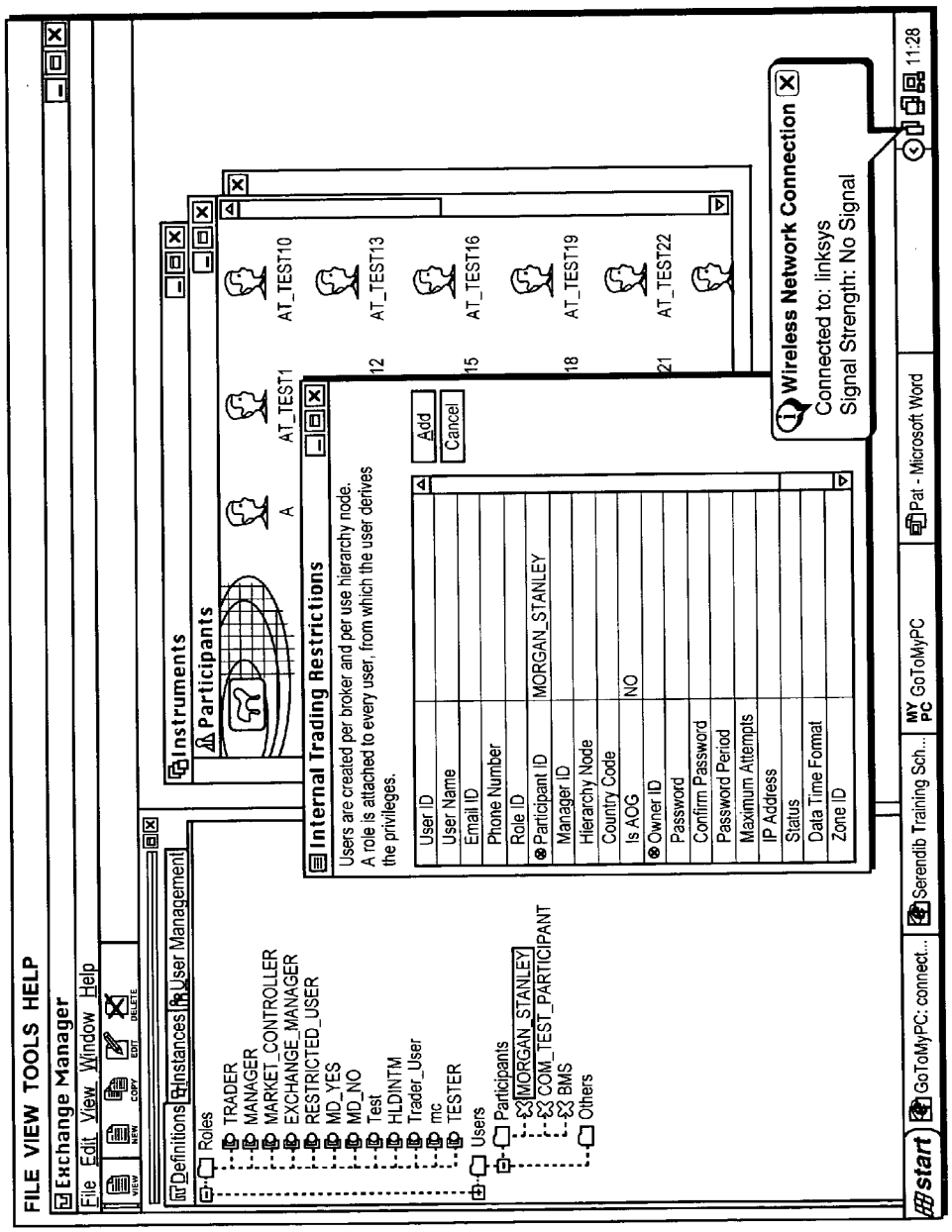

The DBLRI also controls system management, such as, user access to the system and/or user access to particular business operations that the system controls. For example, as depicted in FIG. 19A & B a system administrator may edit the "roles" of various users, and thus, grant or deny them permission to, for example, trade in particular types of securities. The DBLRI thus controls the operations of a business and allows the operations and/or management of the system to be dynamically altered without requiring the re-writing and/or re-compiling of the underlying application software.

What is claimed is:

1. A method for dynamically integrating a business logic rule into an application, the method comprising the steps of:
    stating the business logic rule as an expression in a functional language that utilizes defined operators, functions and keywords, and parameters that correspond to lookup fields in an associated database, and re-defining one or more parameters in the expression to include additional fields and sub-fields of the database;
    parsing the expression into an executable routine; and
    providing the executable routine to the application.

2. The method of claim 1 wherein
    the step of parsing the expression includes generating a parse tree; and
    the step of providing the executable routine includes linking the parse tree with the application.

3. The method of claim 2 wherein
    the step of parsing the expression further includes generating a dynamic library from the parse tree; and
    the step of providing the executable routine includes dynamically linking the dynamic library into the application.

4. The method of claim 2 wherein the step of generating the parse tree includes using a recursive process to produce sub-trees that contain one or more branches or decision points and attaching the sub-trees to nodes in a main tree.

5. The method of claim 1 wherein the step of stating the business rule includes
    modifying the expression to include as parameters newly added fields and sub-fields of the database.

6. The method of claim 5 wherein the step of stating the business rule further includes replacing the expression with another expression.

7. The method of claim 1 wherein the business logic rule is an order validation rule.

8. The method of claim 1 wherein the business logic rule is an order matching rule.

9. The method of claim 1 wherein the business logic rule is an on execution rule.

10. The method of claim 1 wherein the expression can be revised to include any number and arrangement of parameters.

11. The method of claim 10 wherein available parameters are dynamically updated to correspond to changes in the business logic rules.

12. The method of claim 1 wherein the step of stating the business rule includes generating a new expression and including as parameters previously added fields and sub-fields of a database, newly added fields and sub-fields of the database, or both.

13. The method of claim 1 wherein the step of stating the business rule includes generating a new expression that includes any number and arrangement of operators, functions and parameters.

14. A system for dynamically integrating business logic rules with an application program, the system including:
    an application program for executing the business logic rules using system hardware and software;
    a database that includes fields and subfields that correspond to parameters that are associated with the business logic rules;
    a dynamic business logic rule integrator module for
        providing to a user a mechanism to produce an expression of the business logic rule using defined functions, logical operators, and key-words and parameters that are associated with the fields and sub-fields of the database, and
        re-defining one or more parameters to include additional fields or sub-fields of the database, and
        evaluating the expression to produce an executable routine, and
        providing the routine to the application program.

15. The system of claim 14 wherein the database is dynamically configurable with new fields and sub-fields added to correspond to changes in the business logic rules.

16. The system of claim 15 wherein the dynamic business logic rule integrator module makes available to the user parameters associated with the new fields and sub-fields.

17. The system of claim 15 wherein the dynamic business logic rule integrator module provides to the user categories of business logic rules and associated sets of functions, operations, keywords and parameters.

18. The system of claim 17 wherein sets of parameters are dynamically updated to correspond to changes in the business logic rules.

19. The system of claim 18 wherein the dynamic business logic rule integrator module further re-defines one or more parameters to include one or more newly added database fields and sub-fields.

20. The system of claim 14 wherein the dynamic business logic rule integrator module
    evaluates the expression by parsing the expression to produce an executable parse tree, and
    links the parse tree to the application program.

21. The system of claim 20 wherein the dynamic business logic rule integrator module
    further evaluates the expression by producing a dynamic library that corresponds to the parse tree, and
    links the dynamic library to the application program.

22. A system for dynamically integrating business logic rules with an application program, the system including:
    a rule-based engine for controlling business operations in accordance with an organized set of business logic rules;
    an application program for executing the business logic rules using system hardware and software;
    a database that includes fields and subfields that correspond to parameters that are associated with the business logic rules; and
    a dynamic business rule integrating sub-system for providing to a user one or more interfaces through which parameters that are linked to the database and defined operators, functions and keywords are available for use in creating and editing business logic rules as expressions in a functional language and through which one or more parameters in the expressions can be re-defined to include additional fields and sub-fields of the database, the sub-system translating the respective expressions into executable routines and linking the routines to the application software.

23. The system of claim 22 wherein the dynamic business rule integrating sub-system includes one or more interfaces through which a user positions the business logic rules relative to one in an order in which the rules are invoked.

24. The system of claim 23 wherein the dynamic business rule integrating sub-system includes tables that associate parameters with the respective rules, and the sub-system updates the tables to associate different sets of parameters with the respective rules.

25. The system of claim 24 wherein the dynamic business rule integrating sub-system adds parameters to respective tables to associate new parameters with selected rules.

26. The system of claim 25 wherein the dynamic business rule integrating sub-system associates one or more tables with new rules to incorporate the associated parameters with the new rules.

27. The system of claim 26 wherein the database is dynamically updatable to include in the database fields and sub-fields that relate to new parameters included in the rules.

28. The system of claim 22 wherein the dynamic business rule integrating sub-system organizes the operators, functions and parameters by associating selective ones with categories of rules.

* * * * *